(12) United States Patent
Oohashi

(10) Patent No.: US 11,833,748 B2
(45) Date of Patent: Dec. 5, 2023

(54) APPARATUS FOR PRODUCING THREE-DIMENSIONAL MULTILAYER MODEL, METHOD FOR PRODUCING THREE-DIMENSIONAL MULTILAYER MODEL, AND FLAW DETECTOR

(71) Applicant: IHI Corporation, Tokyo (JP)

(72) Inventor: Takeru Oohashi, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/513,371

(22) Filed: Oct. 28, 2021

(65) Prior Publication Data

US 2022/0048107 A1  Feb. 17, 2022

Related U.S. Application Data

(62) Division of application No. 16/616,660, filed as application No. PCT/JP2018/020175 on May 25, 2018.

(30) Foreign Application Priority Data

May 26, 2017  (JP) .................................. 2017-104684

(51) Int. Cl.
*B29C 64/153* (2017.01)
*B33Y 10/00* (2015.01)
(Continued)

(52) U.S. Cl.
CPC ............ *B29C 64/153* (2017.08); *B22F 3/003* (2013.01); *B22F 10/28* (2021.01); *B29C 64/227* (2017.08);
(Continued)

(58) Field of Classification Search
None
See application file for complete search history.

(56) References Cited

U.S. PATENT DOCUMENTS 5,659,248 A   8/1997 Hedengren et al.
6,501,267 B1  12/2002 Kurokawa et al.
(Continued)

FOREIGN PATENT DOCUMENTS

CN   104126117 A    10/2014
DE   102016201290 A1  8/2017
(Continued)

OTHER PUBLICATIONS

Types of Sensing Elements, Eddy Current Testing Technology—1st Edition, Ch. 5, Eclipse Scientific, Dec. 31, 2013, pp. 47-64, pp. 51-53 (Year: 2013).*

(Continued)

*Primary Examiner* — Yung-Sheng M Tsui
(74) *Attorney, Agent, or Firm* — Volpe Koenig

(57) ABSTRACT

A method for producing a three-dimensional multilayer object produces a three-dimensional multilayer object by partially applying energy to a conductive powder and thereby melting or sintering and curing the conductive powder. The method for producing a three-dimensional multilayer object includes: applying energy to the conductive powder to melt or sinter the conductive powder, and detecting a flaw in a surface layer portion of the cured three-dimensional multilayer object by relatively moving a probe, which is disposed spaced apart from the surface layer portion, with respect to the surface layer portion. The method contains an excitation step of generating an eddy current in the surface layer portion and detecting a change in a magnetic field of the surface layer portion.

5 Claims, 14 Drawing Sheets

(51) Int. Cl.
  *B29C 64/255* (2017.01)
  *B29C 64/393* (2017.01)
  *B29C 64/227* (2017.01)
  *B22F 3/00* (2021.01)
  *G06T 7/00* (2017.01)
  *B22F 10/28* (2021.01)
  *B33Y 30/00* (2015.01)
  *B33Y 50/02* (2015.01)
  *B22F 12/00* (2021.01)
  *B22F 10/366* (2021.01)

(52) U.S. Cl.
  CPC .......... *B29C 64/255* (2017.08); *B29C 64/393* (2017.08); *B33Y 10/00* (2014.12); *G06T 7/0004* (2013.01); *B22F 10/366* (2021.01); *B22F 12/226* (2021.01); *B33Y 30/00* (2014.12); *B33Y 50/02* (2014.12)

(56) References Cited

U.S. PATENT DOCUMENTS

| | | |
|---|---|---|
| 8,018,228 B2 | 9/2011 | Lepage et al. |
| 9,494,558 B2 | 11/2016 | Kawata et al. |
| 2004/0026807 A1 | 2/2004 | Andersson et al. |
| 2006/0108712 A1 | 5/2006 | Mattes |
| 2009/0072450 A1 | 3/2009 | Wallgren et al. |
| 2009/0152771 A1 | 6/2009 | Philippi et al. |
| 2012/0007595 A1 | 1/2012 | Lepage |
| 2014/0159266 A1* | 6/2014 | Bamberg .......... B23K 31/125 425/169 |
| 2014/0354274 A1 | 12/2014 | Tsuda et al. |
| 2015/0017054 A1 | 1/2015 | Jakimov et al. |
| 2015/0139849 A1 | 5/2015 | Pialot, Jr. et al. |
| 2016/0167160 A1 | 6/2016 | Hellestam |
| 2016/0167303 A1 | 6/2016 | Petelet |
| 2016/0214319 A1 | 7/2016 | Wiel et al. |
| 2016/0339519 A1 | 11/2016 | Sargent |
| 2016/0349215 A1* | 12/2016 | Todorov ............... B29C 64/386 |
| 2016/0356743 A1 | 12/2016 | Miki et al. |
| 2017/0050270 A1 | 2/2017 | Miyano et al. |
| 2017/0304947 A1 | 10/2017 | Shibazaki |
| 2018/0036964 A1 | 2/2018 | Dehghanniri et al. |
| 2018/0120260 A1 | 5/2018 | Goldfine et al. |
| 2018/0141159 A1 | 5/2018 | Niitani et al. |
| 2018/0266993 A1* | 9/2018 | Todorov ............... B22F 10/28 |

FOREIGN PATENT DOCUMENTS

| | | |
|---|---|---|
| JP | 06-342715 A | 12/1994 |
| JP | 2000-024756 A | 1/2000 |
| JP | 2003-240762 A | 8/2003 |
| JP | 2003-531034 A | 10/2003 |
| JP | 2005-337909 A | 12/2005 |
| JP | 2005337909 A * | 12/2005 |
| JP | 2007-106070 A | 4/2007 |
| JP | 2007-307742 A | 11/2007 |
| JP | 2008-540100 A | 11/2008 |
| JP | 2010-117370 A | 5/2010 |
| JP | 2010-520091 A | 6/2010 |
| JP | 2012-242358 A | 12/2012 |
| JP | 2012-247377 A | 12/2012 |
| JP | 2012242358 A * | 12/2012 |
| JP | 2015-527942 A | 9/2015 |
| JP | 2016-533432 A | 10/2016 |
| JP | 2016-224010 A | 12/2016 |
| JP | 2018-024242 A | 2/2018 |
| JP | 2018-507957 A | 3/2018 |
| WO | 2010/095987 A1 | 8/2010 |
| WO | 2014/071968 A1 | 5/2014 |
| WO | 2015/118508 A1 | 8/2015 |
| WO | 2016/042610 A1 | 3/2016 |
| WO | 2016/075802 A1 | 5/2016 |
| WO | 2016/096438 A1 | 6/2016 |
| WO | 2016/151783 A1 | 9/2016 |
| WO | 2017/163431 A1 | 9/2017 |

OTHER PUBLICATIONS

"Eddy Current Testing Technology", Eddy Current Testing Technology—1st Edition, Eclipse Scientific, (Dec. 31, 2013).

* cited by examiner

*Fig.4*
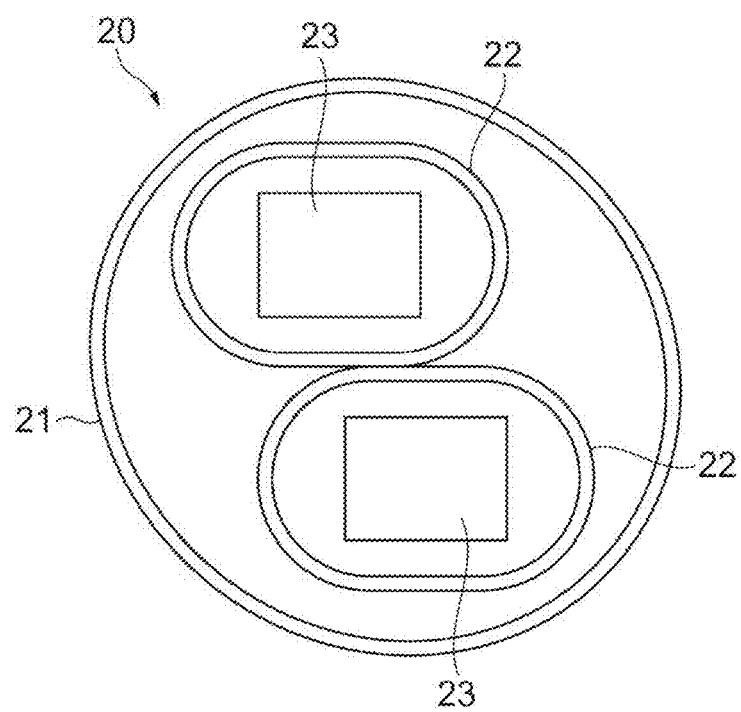
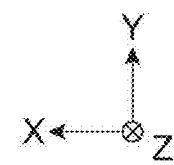

APPARATUS FOR PRODUCING THREE-DIMENSIONAL MULTILAYER MODEL, METHOD FOR PRODUCING THREE-DIMENSIONAL MULTILAYER MODEL, AND FLAW DETECTOR

CROSS-REFERENCE TO RELATED APPLICATIONS

This U.S. non-provisional patent application is a divisional of and claims priority to U.S. patent application Ser. No. 16/616,660, filed on Nov. 25, 2019, which is a 371 National Phase application claiming priority to PCT/JP2018/020175, filed on May 25, 2018, which claims priority under 35 U.S.C. § 119 of Japanese Patent Application No. 2017-104684, filed May 26, 2017 in the Japanese Patent Office, the entire contents of which are hereby incorporated by reference.

TECHNICAL FIELD

The present disclosure relates to an apparatus for producing a three-dimensional multilayer object, a method for producing a three-dimensional multilayer object, and a flaw detector.

BACKGROUND ART

In the related art, there is an apparatus that produces a three-dimensional product by disposing powder, which is a raw material, in layers on a work table and sequentially melting powder layers by applying energy to a selected portion of the powder layers (for example, refer to Patent Literature 1). The apparatus for producing a three-dimensional product produces three-dimensional products by repeating following steps; partially melting one powder layer and curing the molten powder, then forming another powder layer on the powder layer, and further melting and curing a selected portion.

CITATION LIST

Patent Literature

Patent Literature 1: Japanese Unexamined Patent Publication No. 2003-531034

SUMMARY OF INVENTION

Technical Problem

However, in the related art, after the production of the three-dimensional product has been completed, the three-dimensional product is inspected. For this reason, if a flaw present inside the three-dimensional product has been detected, it is not easy to repair the flaw.

The present disclosure describes an apparatus for producing a three-dimensional multilayer object, a method for producing a three-dimensional multilayer object, and a flaw detector capable of detecting a flaw in a three-dimensional multilayer object during the production of the three-dimensional multilayer object.

Solution to Problem

According to one aspect of the present disclosure, there is provided an apparatus for producing a three-dimensional multilayer object which produces a three-dimensional multilayer object by partially applying energy to a conductive powder and thereby melting or sintering and curing the conductive powder, the apparatus including: a holding unit holding the conductive powder, and holding the cured three-dimensional multilayer object; an energy application unit applying energy to a laminate of the conductive powder held by the holding unit; a probe disposed spaced apart upward from a surface layer portion of the cured three-dimensional multilayer object and detecting a flaw in the surface layer portion; and a probe moving mechanism relatively moving the probe with respect to the surface layer portion. The probe contains an excitation coil generating an eddy current in the surface layer portion, and a detection coil detecting a change in a magnetic field of the surface layer portion.

Effects of Invention

According to the present disclosure, it is possible to detect a flaw in a three-dimensional multilayer object during the production of the three-dimensional multilayer object.

BRIEF DESCRIPTION OF DRAWINGS

c. FIG. 4 is a bottom view illustrating the coil unit of FIG. 3.

DESCRIPTION OF EMBODIMENTS

Figure 1:
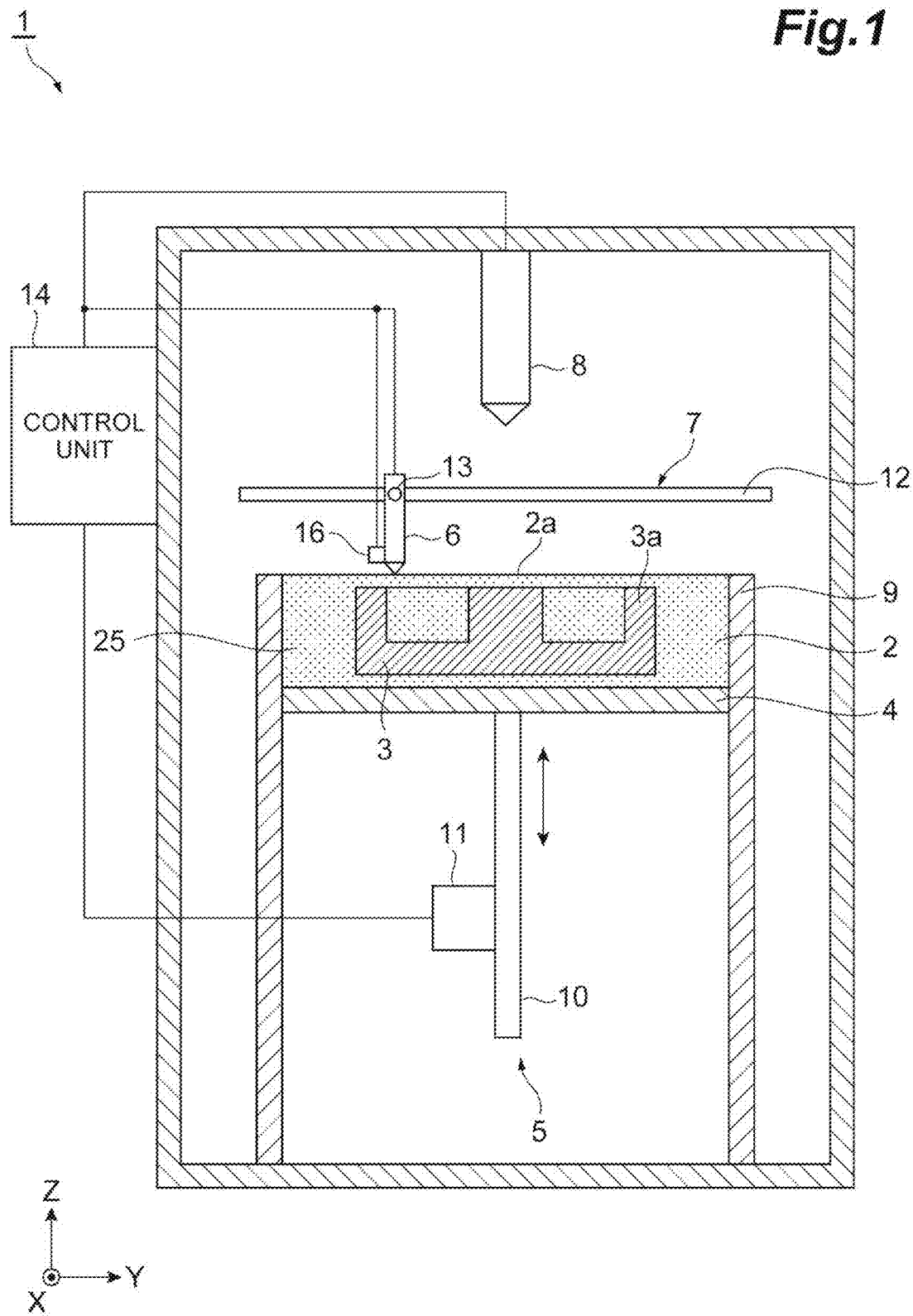
FIG. 1 is a schematic configuration view illustrating an apparatus for producing a three-dimensional multilayer object of a first embodiment of the present disclosure.

According to one aspect of the present disclosure, there is provided an apparatus for producing a three-dimensional multilayer object which produces a three-dimensional multilayer object by partially applying energy to a conductive powder and thereby melting or sintering and curing the conductive powder, the apparatus including: a holding unit holding the conductive powder, and holding the cured three-dimensional multilayer object; an energy application unit applying energy to the conductive powder held by the holding unit; a probe disposed spaced apart from a surface layer portion of the cured three-dimensional multilayer object and detecting a flaw in the surface layer portion; and a probe moving mechanism relatively moving the probe with respect to the surface layer portion. The probe contains an excitation coil generating an eddy current in the surface layer portion, and a detection coil detecting a change in a magnetic field of the surface layer portion.

Since the apparatus for producing a three-dimensional multilayer object of the present disclosure is capable of detecting a flaw in the surface layer portion of the three-dimensional multilayer object during production by relatively moving the probe with respect to the surface layer portion in a scanning direction, it is possible to produce the three-dimensional multilayer object by further adding the conductive powder after having confirmed that there is no flaw in the surface layer portion. For example, if a flaw is detected in the surface layer portion, it is possible to produce the three-dimensional multilayer object by repairing the flaw at that point of time and further adding the conductive powder after the repair is completed. "Relatively moving the probe with respect to the surface layer portion" contains "moving the probe" and "moving the surface layer portion". For example, it is possible to move the surface layer portion by moving the holding unit.

The apparatus for producing a three-dimensional multilayer object may be configured to further include a regulation unit leveling an upper surface of a laminate of the conductive powder held by the holding unit, and a regulation unit moving mechanism relatively moving the regulation unit with respect to the conductive powder. "Relatively moving the regulation unit with respect to the conductive powder" contains "moving the regulation unit" and "moving the conductive powder". For example, it is possible to move the conductive powder by moving the holding unit.

In some aspects, a bottom surface of the probe may be configured to be disposed higher than a lower end of the regulation unit. Therefore, it is possible to detect a flaw in the surface layer portion in a state where the probe is reliably in no contact with the conductive powder.

In some aspects, the regulation unit moving mechanism may be configured to serve also as the probe moving mechanism. Therefore, it is possible to move the regulation unit and the probe by using the regulation unit moving mechanism. It is possible to link the movement of the probe with the movement of the regulation unit.

In some aspects, the probe may be configured to be disposed behind the regulation unit in a movement direction of the regulation unit. Therefore, after the upper surface of the laminate of the conductive powder has been leveled by the regulation unit, the probe is allowed to pass thereby.

In some aspects, the probe may be configured to be attached to the regulation unit. Therefore, it is possible to detect a flaw in the surface layer portion by moving the probe along with the regulation unit, and thus it is not necessary to separately perform movement of the regulation unit and movement of the probe, and to shorten a production time of the entire process containing an inspection step.

According to one aspect of the present disclosure, there is provided a method for producing a three-dimensional multilayer object in which a three-dimensional multilayer object is produced by partially applying energy to a conductive powder and thereby melting or sintering and curing the conductive powder, the method including: an energy application step of applying energy to the conductive powder to melt or sinter the conductive powder; and a flaw detection step of detecting a flaw in a surface layer portion of the cured three-dimensional multilayer object by relatively moving a probe, which is disposed spaced apart from the surface layer portion, with respect to the surface layer portion. The flaw detection step contains an excitation step of generating an eddy current in the surface layer portion, and a detection step of detecting a change in a magnetic field of the surface layer portion.

In the method for producing a three-dimensional multilayer object of the present disclosure, since it is possible to detect a flaw in the surface layer portion of the three-dimensional multilayer object during production by relatively moving the probe with respect to the surface layer portion in a scanning direction, it is possible to produce the three-dimensional multilayer object by further adding the conductive powder after having confirmed that there is no flaw in the surface layer portion. For example, if a flaw is detected in the surface layer portion, it is possible to produce the three-dimensional multilayer object by repairing the flaw at that point of time and further adding the conductive powder after the repair is completed.

In some aspects, the method may further contain a step of leveling an upper surface of the conductive powder held by a holding unit by relatively moving a regulation unit with respect to the conductive powder. The flaw detection step may be executed when the step of leveling is executed. In the flaw detection step, a flaw may be detected in the surface layer portion by disposing a bottom surface of the probe higher than a lower end of the regulation unit and relatively moving the probe along with the regulation unit with respect to the surface layer portion. Therefore, it is possible to detect a flaw in the surface layer portion in a state where the probe is reliably in no contact with the conductive powder. In the flaw detection step, a flaw may be detected in the surface layer portion by disposing the probe behind the regulation unit in a relative movement direction of the regulation unit. Therefore, after the upper surface of the laminate of the conductive powder has been leveled by the regulation unit, the probe is allowed to pass thereby. After the energy application step has been executed a plurality of times, the flaw detection step may be executed for the surface layer portion formed of a plurality of layers.

According to one aspect of the present disclosure, there is provided a flaw detector that detects a flaw in a surface layer portion of a three-dimensional multilayer object during production, the detector including a probe extending in a second direction intersecting a first direction which is a scanning direction. The probe contains a plurality of coil units disposed side by side in the second direction. Each of the coil units includes an excitation coil generating an eddy current in the surface layer portion, and a pair of detection coils disposed side by side inside the excitation coil.

The flaw detector of the present disclosure is capable of detecting flaws in a wide range in the second direction and reducing a flaw detection time by moving the probe in the scanning direction. Since a flaw may be detected in the surface layer portion of the three-dimensional multilayer object during production, it is possible to produce the three-dimensional multilayer object by further adding a conductive powder after having confirmed that there is no flaw in the surface layer portion. For example, if a flaw is detected in the surface layer portion, it is possible to produce the three-dimensional multilayer object by repairing the flaw at that point of time and further adding the conductive powder after the repair is completed. Therefore, it is not necessary to repair a flaw inside the three-dimensional multilayer object after the production of the three-dimensional multilayer object has been completed.

The flaw detector may further include a regulation unit attached to the probe. Therefore, it is possible to perform flaw detection and to level an upper surface of a laminate of the conductive powder while moving the probe. The pair of detection coils may be disposed at positions overlapping each other in the first direction. Therefore, it is possible to reduce the effect of noise and to accurately detect a flaw by calculating a difference between signals detected by the pair of detection coils.

Hereinbelow, a preferred embodiment of the present disclosure will be described in detail with reference to the drawings. Note that in the drawings, the same reference signs will be assigned to the same or equivalent parts and duplicated descriptions will be omitted.

An apparatus 1 for producing a three-dimensional object by additive manufacturing (hereinbelow, referred to as a "production apparatus") of a first embodiment illustrated in FIG. 1 is a so-called 3D printer, and produces a three-dimensional component (three-dimensional multilayer object) 3 by repeating a step of partially applying energy to a metallic powder (conductive powder) 2 disposed in layers and thereby melting and curing the metallic powder 2 a plurality of times.

The three-dimensional component 3 is, for example, a mechanical component, and may be other structures. Examples of the metallic powder include a titanium metal powder, an Inconel (registered trademark) powder, and an aluminum powder. The conductive powder is not limited to a metallic powder, and may be a powder such as carbon fiber reinforced plastics (CFRP) containing carbon fiber and resin, or may be other powders having conductivity.

The production apparatus 1 includes: a work table (holding unit) 4; a vertical position adjusting mechanism 5; a brush unit (regulation unit) 6; a first moving mechanism (regulation unit moving mechanism) 7; and a radiation gun (energy application unit) 8.

The work table 4 forms, for example, a plate shape, and the metallic powder 2 which is a raw material of the three-dimensional component 3 is disposed on the work table 4. The metallic powder 2 is disposed, for example, in layers a plurality of times on the work table 4. A laminate of the metallic powder 2 on the work table 4 is referred to as a powder bed 25. The work table 4 forms, for example, a rectangular shape in a plan view. The work table 4 is movable in a Z direction (vertical direction), and sequentially descends in response to the number of layers of the metallic powder 2. A guide portion 9 guiding the movement of the work table 4 is provided at an outer periphery of the work table 4. The guide portion 9 forms a square tube shape so as to correspond to the outer shape of the work table 4. The guide portion 9 having a square tube shape and the work table 4 form an accommodation portion that accommodates the powder bed 25 forming a box shape. The work table 4 is movable in the Z direction inside the guide portion 9.

The vertical position adjusting mechanism 5 is, for example, a rack and pinion type driving mechanism, and moves the work table 4 in the Z direction. The vertical position adjusting mechanism 5 contains a vertical member (rack) 10 having a bar shape which is connected to a bottom surface of the work table 4 and extends downward, and a driving source 11 for driving the vertical member 10.

For example, an electric motor can be used as the driving source 11. A pinion is provided on an output shaft of the electric motor, and a tooth profile meshing with the pinion is provided on a side surface of the vertical member 10. If the electric motor is driven, the pinion rotates to transmit power, and thus the vertical member 10 moves in the vertical direction. When the rotation of the electric motor is stopped, the vertical member 10 is positioned, and the position of the work table 4 in the Z direction is determined and the position is held. The vertical position adjusting mechanism 5 is not limited to a rack and pinion type driving mechanism, but may include other driving mechanisms such as a ball screw and a cylinder. The vertical position adjusting mechanism 5 is capable of descending the holding unit, and holding the position of the holding unit in the vertical direction.

The brush unit 6 is disposed above the work table 4, and levels a surface (upper surface) 2a of an uppermost layer of the powder bed 25 placed on the work table 4. The brush unit 6 is movable in a Y direction (first direction) intersecting the Z direction, and levels the surface 2a of the powder bed 25. A lower end portion of the brush unit 6 comes into contact with the surface 2a of the powder bed 25 to level the surface 2a at a uniform height. The brush unit 6 has a predetermined width in an X direction (second direction), and corresponds to the entire length of the work table 4 in the X direction. The X direction is a direction intersecting the Z direction and the Y direction. The production apparatus 1 may be configured to include other regulation units such as a roller unit and a plate-shaped member instead of the brush unit 6. The regulation unit may be any type of member capable of leveling the surface of the powder bed 25.

The first moving mechanism 7 is, for example, a rack and pinion type driving mechanism, and moves the brush unit 6 in the Y direction. The first moving mechanism 7 contains a pair of guide rails 12 on both sides in the X direction which extend in the Y direction, and a driving source 13 attached to the brush unit 6. In the embodiment, an application mechanism applying the powder contains the regulation unit and the first moving mechanism. The first moving mechanism 7 relatively moves the brush unit 6 with respect to the powder bed 25.

For example, an electric motor can be used as the driving source 13. A pinion is provided on an output shaft of the electric motor, and a tooth profile (rack) meshing with the pinion is provided on one guide rail 12. The pair of guide rails 12 are attached to, for example, a housing (frame body) of the production apparatus 1. A driven roller rotationally moving along the other guide rail 12 is attached to the brush unit 6. If the electric motor is driven, the pinion rotates, and thus the brush unit 6 moves along the guide rail 12 in the Y direction.

The radiation gun 8 melts the metallic powder 2 by irradiating the metallic powder 2 with radiation from above the work table 4. The radiation gun 8 is movable to a predetermined position, and locally melts the metallic powder 2 by radiating radiation corresponding to the position. The radiation gun 8 radiates radiation as energy beams. The production apparatus 1 may be configured to include other energy application units instead of the radiation gun 8. The energy beams may be charged particle beams such as electron beams, or may be laser beams. The energy application unit melts the conductive powder, for example, by electron beam melting (EBM), but the energy application unit is not limited to employing the electron beam melting. For example, the energy application unit may employ selective laser melting (SLM) in which the conductive powder is melted by irradiating the conductive powder with laser beams as energy beams, or selective laser sintering (SLS) in which the conductive powder is sintered by irradiating the powder with laser beams. The energy application unit may melt or sinter and solidify (cure) the conductive powder by applying energy to the conductive powder by other methods and thereby heating the conductive powder.

The production apparatus 1 contains a control unit 14 controlling the production apparatus 1. The control unit 14 controls the vertical position adjusting mechanism 5, the first moving mechanism 7, and the radiation gun 8. The control unit 14 is a computer formed of hardware such as a central processing unit (CPU), a read only memory (ROM), and a random access memory (RAM) and software such as a program stored in the ROM. The control unit 14 controls the position of the work table 4 in the Z direction by controlling the vertical position adjusting mechanism 5. The control unit 14 controls the movement of the brush unit 6 by controlling the first moving mechanism 7. The control unit 14 controls a radiation irradiation position and a radiation irradiation time by controlling the radiation gun 8.

Figure 2:
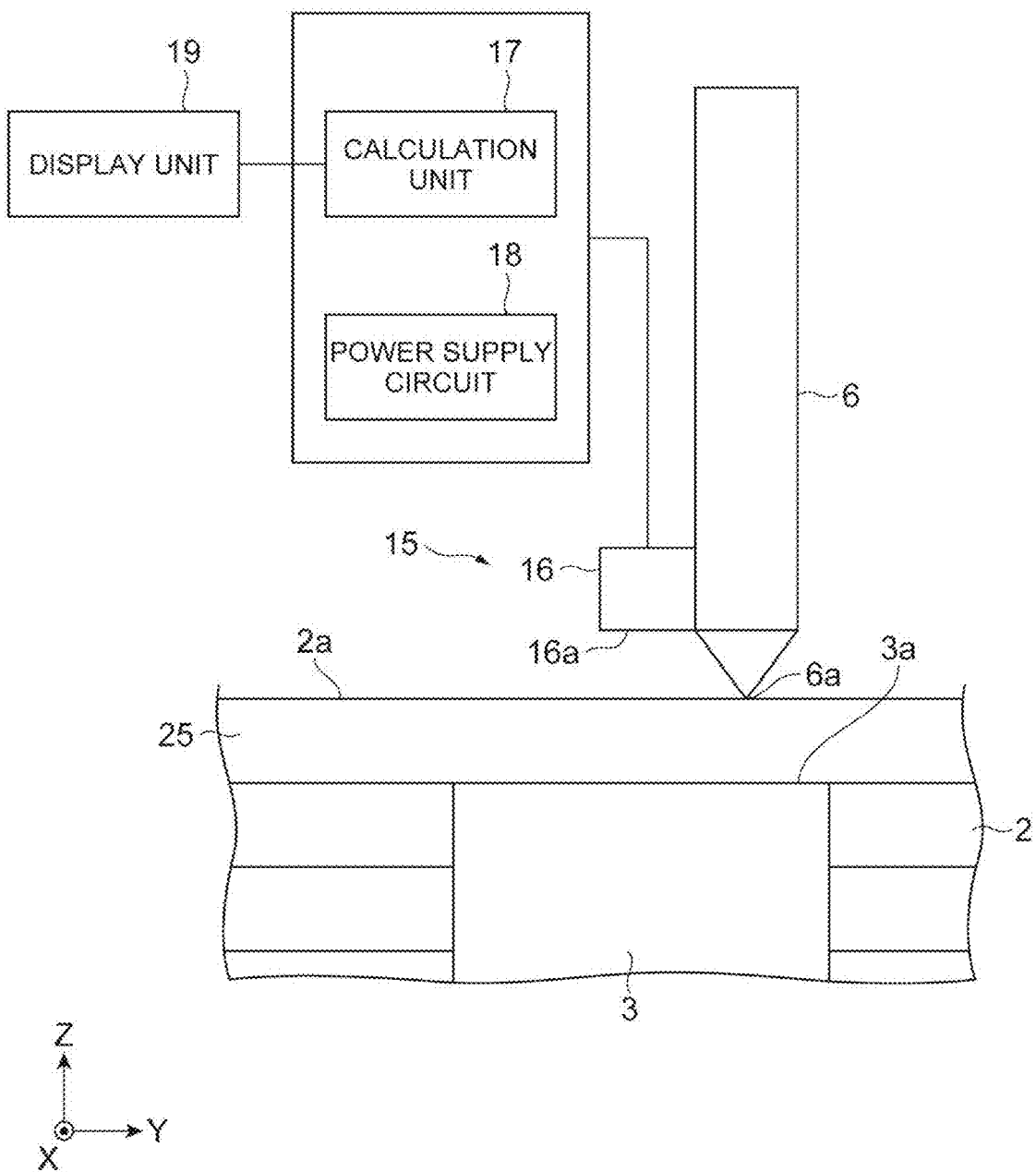
FIG. 2 is a schematic configuration view illustrating a flaw detection device of the first embodiment of the present disclosure.

Herein, as illustrated in FIG. 2, the production apparatus 1 contains a flaw detection device (flaw detector) 15 detecting a flaw in a surface layer portion 3a of the three-dimensional component 3. The flaw detection device 15 includes: a probe 16; a calculation unit 17; a power supply circuit 18; and a display unit 19.

The probe 16 is attached to the brush unit 6, and is movable in the Y direction along with the brush unit 6. The first moving mechanism 7 serves also as a probe moving mechanism moving the probe 16 in the Y direction. A bottom surface 16a of the probe 16 is disposed higher than a lower end 6a of the brush unit 6. A gap is formed between the bottom surface 16a of the probe 16 and the surface 2a of the powder bed 25. The probe 16 is not in contact with the metallic powder 2 and the three-dimensional component 3. The probe 16 is disposed behind the brush unit 6 in the scanning direction. The scanning direction is, for example, a direction from a left side toward a right side in FIGS. 1 and 2. Note that the scanning direction is not limited to the direction but may be any direction.

Figure 3:
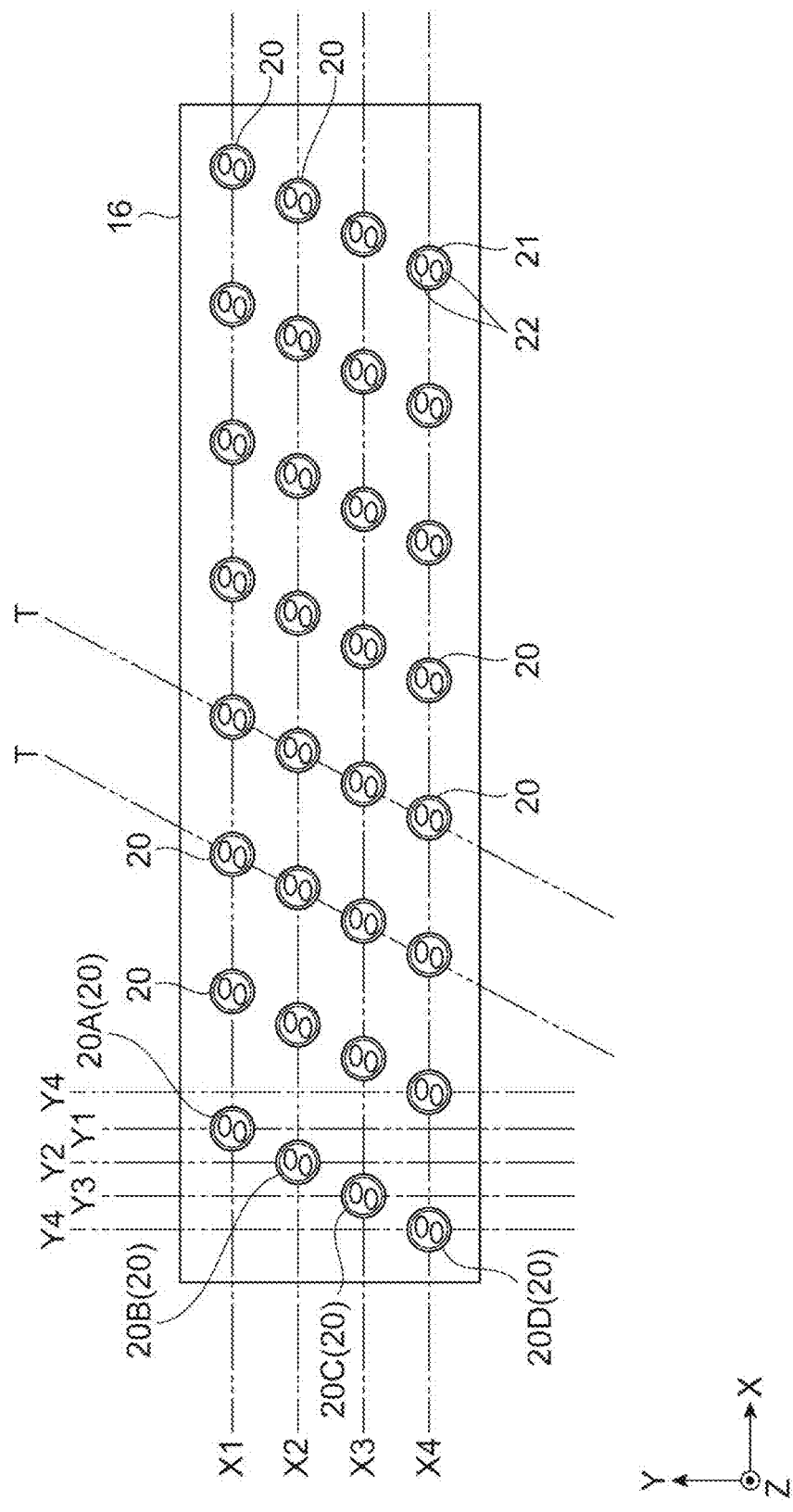
FIG. 3 is a view illustrating the disposition of a plurality of coil units in a probe of the first embodiment of the present disclosure as seen from above.

As illustrated in FIG. 3, the probe 16 extends in the X direction intersecting the Y direction which is the scanning direction. The probe 16 contains a plurality of coil units 20 disposed side by side in the X direction. For example, eight coil units 20 are disposed in the X direction. In the probe 16, the plurality of coil units 20 disposed side by side in the X direction forms one row. The plurality of coil units 20 forms a row along each of virtual straight lines X1 to X4 extending in the X direction. In the probe 16, a plurality of rows (for example, four rows) of the coil units 20 are disposed side by side in the Y direction. The virtual straight lines X1 to X4 are disposed spaced apart from each other in the Y direction. The probe 16 includes, for example, 32 coil units 20 in total. The coil units 20 of the probe 16 are accommodated in a case forming, for example, a box shape.

A plurality of the coil units 20 are disposed along a virtual straight line T. The straight line T is obliquely disposed with respect to the X direction and the Y direction. The plurality of coil units 20, for example, four coil units 20 are disposed along the straight line T. The plurality of coil units 20 are disposed at different positions in the X direction, respectively. The plurality of coil units 20 may be disposed without gaps therebetween when seen from the Y direction.

In FIG. 3, virtual straight lines Y1 to Y4 extending in the Y direction are illustrated. The straight lines Y1 to Y4 are disposed spaced apart from each other in the X direction. A coil unit 20A is disposed at an intersection point between the straight line X1 and the straight line Y1. A coil unit 20B is disposed at an intersection point between the straight line X2 and the straight line Y2. A coil unit 20C is disposed at an intersection point between the straight line X3 and the straight line Y3. A coil unit 20D is disposed at an intersection point between the straight line X4 and the straight line Y4. The plurality of coil units 20 contain the coil units 20A to 20D. One coil unit 20 is disposed on each of the straight lines Y1 to Y4. In the probe 16, another coil unit 20 is not disposed behind the coil unit 20 in the scanning direction. The straight lines X1 to X4 are disposed in the order of X4, X3, X2, and X1 in the Y direction. The straight lines Y1 to Y4 are repeatedly disposed in the order of Y4, Y3, Y2, and Y1 in the X direction. Gaps between the straight lines X1 to X4 are wider than gaps between the straight lines Y1 to Y4. Gaps between the straight lines T in the X direction are wider than the gaps between the straight lines X1 to X4.

As illustrated in FIG. 4, the coil unit 20 includes an excitation coil 21; a pair of detection coils 22; and ferrite cores (iron cores) 23. The excitation coil 21 is supplied with an alternating current from the power supply circuit 18 to generate a magnetic field, and to generate an eddy current in the surface layer portion 3a of the three-dimensional component 3. For example, the excitation coil 21 is formed around an axis line extending in the Z direction.

The pair of detection coils 22 are disposed inside the excitation coil 21. For example, the detection coil 22 is formed around an axis line extending in the Z direction. The ferrite core 23 is disposed inside the detection coil 22. The ferrite core 23 forms, for example, a bar shape and extends in the Z direction. The ferrite core 23 may have a columnar shape, or may have a prismatic shape.

When seen from the Z direction, the pair of detection coils 22 are disposed adjacent to each other in the Y direction in a state where the positions thereof in the X direction are offset from each other such that portions thereof overlap each other in the X direction. Namely, when seen from the Y direction, the pair of detection coils 22 are disposed such that portions thereof overlap each other and remaining portions do not overlap each other in the X direction. The pair of detection coils 22 detect a change in the magnetic field induced by the eddy current of the surface layer portion 3a.

If there is a flaw in the surface layer portion 3a, a change occurs in the flow of the eddy current, and thus the magnetic field becomes changed. Therefore, it is possible to detect whether or not there is a flaw by detecting a change in the magnetic field with the detection coils 22. If one of the pair of detection coils 22 detects a change in the magnetic field and the other does not detect a change in the magnetic field, it is possible to accurately detect a change in the magnetic field by calculating a difference between signals detected by the pair of detection coils 22. Since the difference between the signals becomes the maximum when the probe passes by above the flaw, it is possible to prevent electrical noise and accurately detect the flaw by calculating the difference between the signals detected by the plurality of detection coils 22.

A flaw detected by the detection coils 22 is, for example, a weld penetration defect, a crack, a fusion, a porosity (void), or the like.

The calculation unit 17 is electrically connected to the pair of detection coils 22, and calculates a difference between signals detected by the pair of detection coils 22. The calculation unit 17 is a computer formed of hardware such as a CPU, a ROM, and a RAM and software such as a program stored in the ROM. The calculation unit 17 may be configured separately from the control unit 14, and may be configured to be contained in the control unit 14.

The power supply circuit 18 supplies an alternating current to the excitation coil 21. The frequency of the alternating current supplied to the excitation coil 21 may be, for example, 500 kHz to 2 MHz, or may be other frequencies. An eddy current is generated in the surface layer portion 3$a$ of the three-dimensional component 3 by supplying an alternating current to the excitation coil 21. The surface layer portion 3$a$ contains the surface and an inner portion in the vicinity of the surface of the three-dimensional component 3, for example, may contain a region from the surface to a depth of 1 mm. The surface layer portion may contain a region, for example, to a depth of 2 mm, or may contain a region to other depths. The probe 16 is capable of detecting a flaw in a region to the depth of a plurality of layers (for example, five layers) of the metallic powder 2, which are equivalent to the surface layer portion 3$a$ of the three-dimensional component 3.

Figure 5:
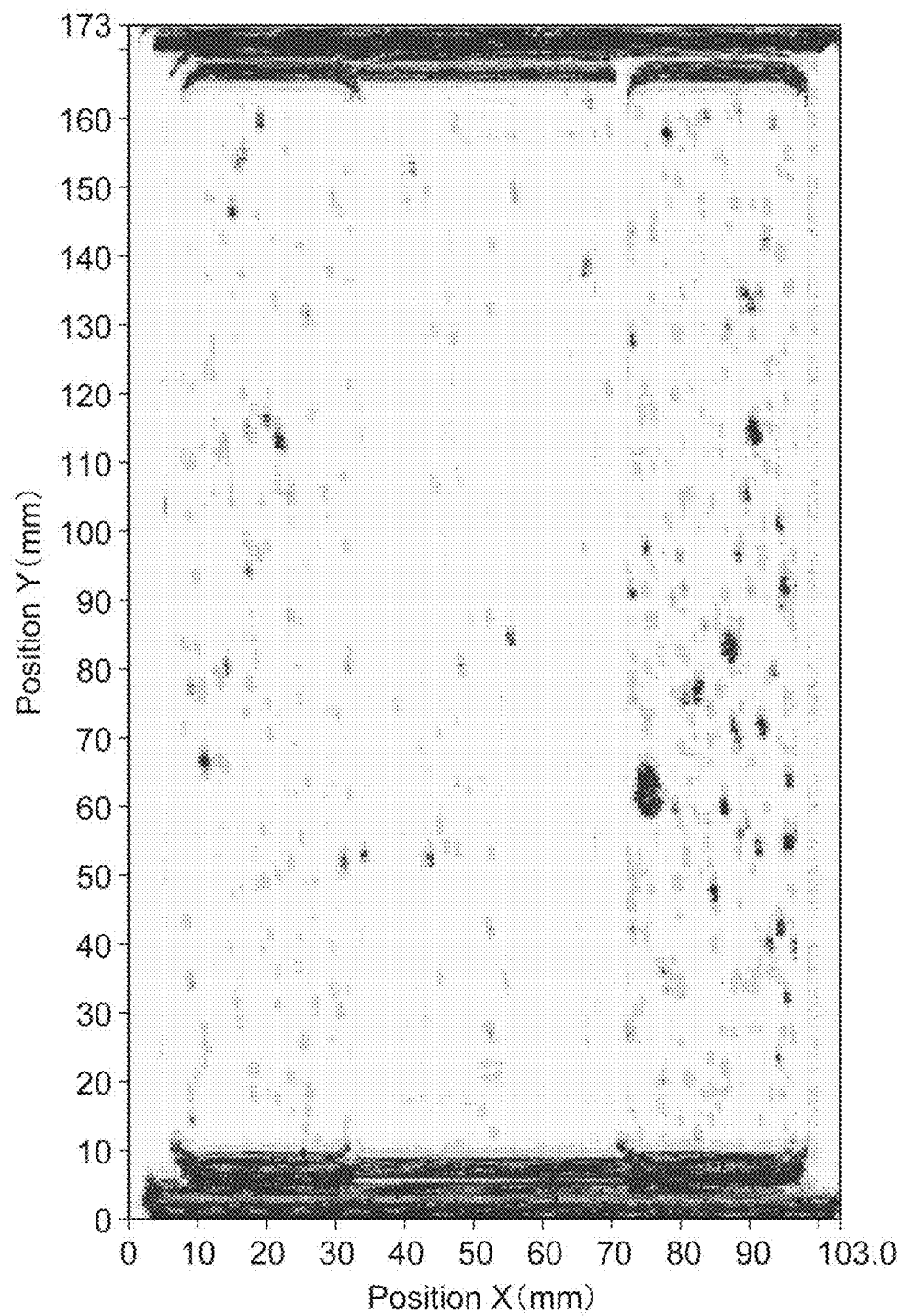
FIG. 5 is a view illustrating an example of flaw detection result obtained by the flaw detection device.
Figure 6:
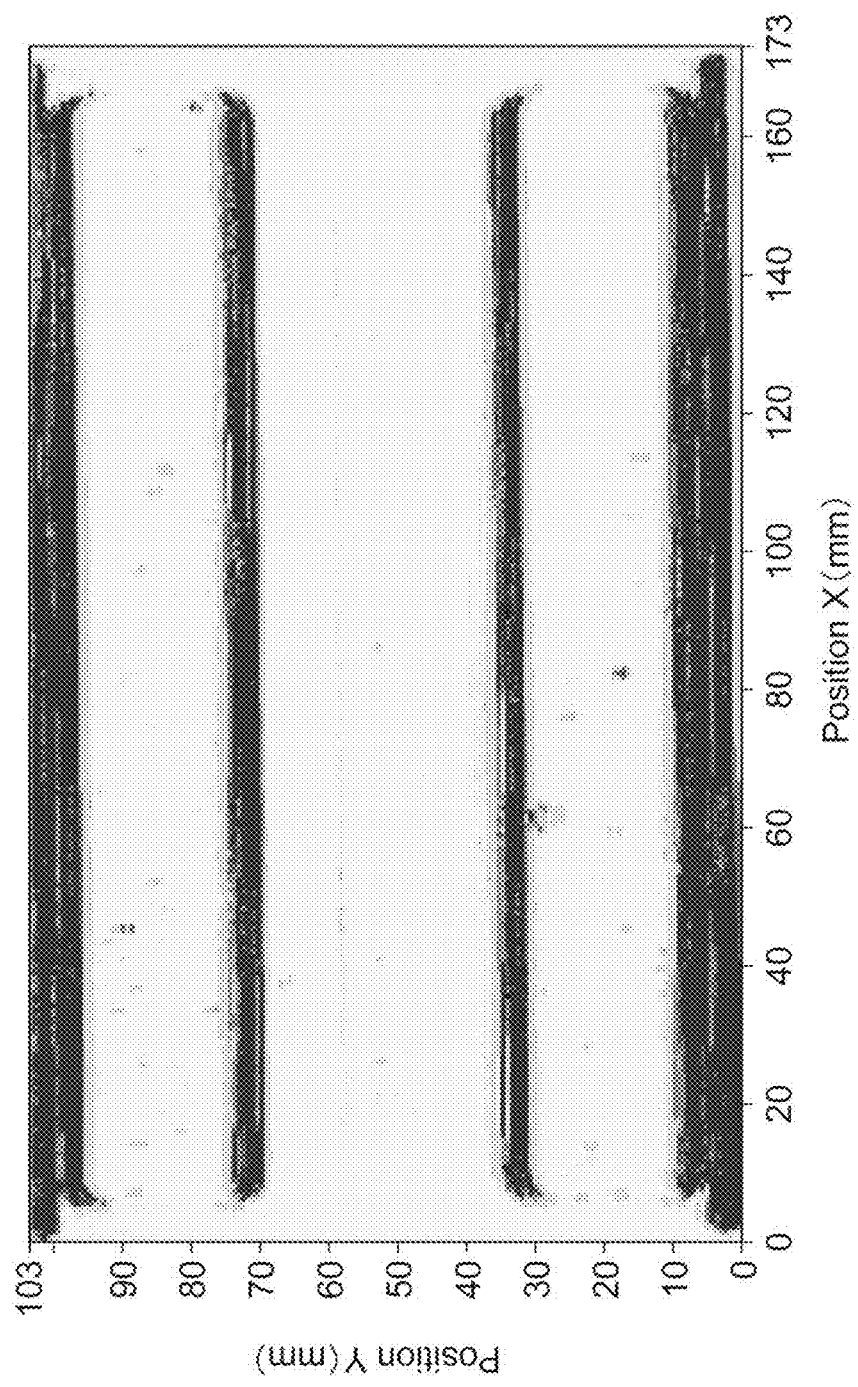
FIG. 6 is a view illustrating an example of flaw detection result obtained by the flaw detection device.

The display unit 19 displays image information regarding a flaw detection result output from the calculation unit 17. The display unit 19 is capable of displaying a position where a flaw is present and a position where no flaw is present by using color gradations. Each of FIGS. 5 and 6 illustrates one example of image information regarding a flaw detection result. FIGS. 5 and 6 illustrate results of detecting flaws in test pieces, each of which contains a flaw provided in a surface layer portion. In FIGS. 5 and 6, a region where a difference between detected signals is large is illustrated dark. For example, in FIG. 5, a flaw is present at a position 75 mm in the X direction and 65 mm in the Y direction from the origin, and in FIG. 6, a flaw is present at a position 60 mm in the X direction and 30 mm in the Y direction from the origin. Since a difference between signals is large even with a shape discontinuity, in FIGS. 5 and 6, the shape discontinuity is illustrated in dark color.

Figure 7:
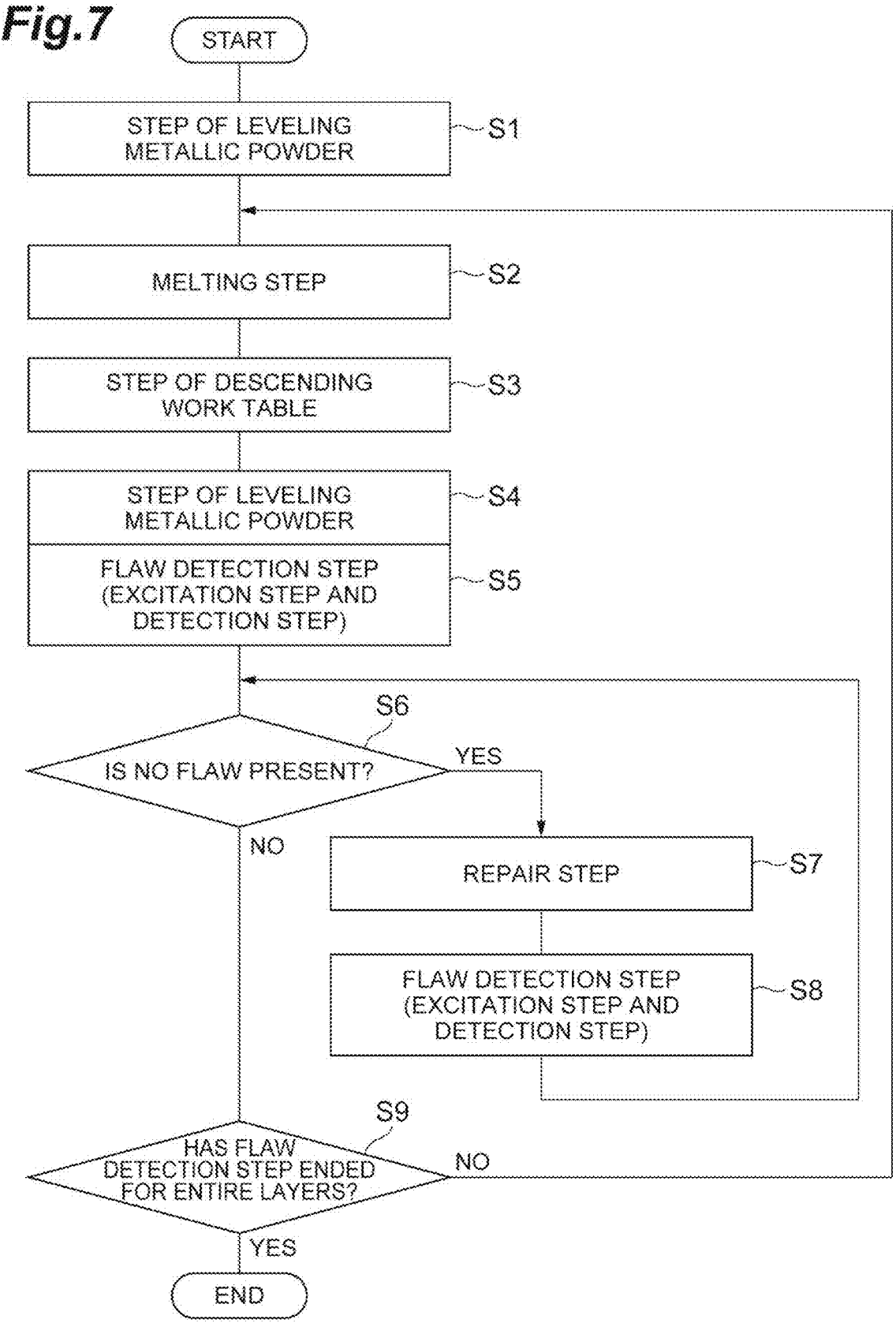
FIG. 7 is a flowchart illustrating a procedure of a method for producing a three-dimensional multilayer object.

Subsequently, a method for producing a three-dimensional component (method for producing a three-dimensional multilayer object) will be described. FIG. 7 is a flowchart illustrating a procedure of the method for producing a three-dimensional component. The method for producing a three-dimensional component is executed using, for example, the production apparatus 1.

In the embodiment, firstly, a powder layer as a first layer is to be formed. Herein, the metallic powder 2 for the first layer is supplied onto the work table 4, and the surface 2$a$ of the powder bed 25 is leveled by moving the brush unit 6 in the Y direction (Step S1). Step S1 contains an application step of applying the metallic powder 2. The metallic powder 2 is supplied onto the work table 4 from, for example, a powder storage tank not illustrated.

Subsequently, a melting step (energy application step) of melting the metallic powder 2 on the work table 4 by irradiating the metallic powder 2 with radiation is performed (Step S2). Instead of the melting step, a sintering step (energy application step) of sintering the conductive powder by partially applying energy to the conductive powder may be performed. A preheating step of raising the temperature of the metallic powder 2 by applying energy to the metallic powder 2 may be executed, for example, after the application step (Step S1) and before the energy application step (Step S2). After Step S2 has ended, the work table 4 is descended (Step S3). A space for adding the metallic powder 2 for a second layer is secured by descending the work table 4.

Subsequently, a powder layer as a second layer ($n+1^{th}$ layer) is to be formed. Herein, after the metallic powder 2 of the first molten layer ($n^{th}$ layer) has been cured, the metallic powder 2 for the second layer ($n+1^{th}$ layer) is supplied onto the work table 4 (onto the metallic powder of the $n^{th}$ layer), and the surface 2$a$ of a laminate ($n+1^{th}$ layer) of the metallic powder 2 is leveled by moving the brush unit 6 in the Y direction (Step S4). Step S4 contains the application step of applying the metallic powder 2. At that time, a flaw detection step (Step S5) is executed when the brush unit 6 is moved. For example, along with leveling the surface 2$a$ of the metallic powder 2 of the second layer ($n+1^{th}$ layer), the flaw detection step is executed for the surface layer portion 3$a$ of the first layer ($n^{th}$ layer).

In the flaw detection step, an excitation step and a detection step are performed. The flaw detection step may be executed for, for example, one layer of the surface layer portion 3$a$. The flaw detection step may be executed for, for example, a plurality of layers (two to four layers) of the surface layer portion 3$a$. For example, after the surface layer portion 3$a$ containing a plurality of layers has been shaped by repeatedly performing the melting step (energy application step), the work table descending step, and the step of leveling the metallic powder a plurality of times, the flaw detection step may be collectively performed on the plurality of layers of surface layer portion 3$a$. The melting step, the work table descending step, and the step of leveling the metallic powder are performed a plurality of times, for example, when a final step of leveling the metallic powder is performed, the flaw detection step may be collectively performed on the plurality of layers of surface layer portion 3$a$.

In the excitation step, the excitation coil 21 is supplied with current to generate a magnetic field, and to generate an eddy current in the surface layer portion 3$a$. In the excitation step, the order of excitation may be changed for a plurality of the excitation coils 21. In the excitation step, the order of excitation may be changed, for example, depending on the positions of the excitation coils 21 in the scanning direction. In the excitation step, the order of excitation may set for the coil units 20 on the straight lines X1 to X4 illustrated in FIG. 3.

In the excitation step, the excitation coils 21 may be excited, for example, in the order of the coil unit 20A on the straight line X1, the coil unit 20B on the straight line X2, the coil unit 20C on the straight line X3, and the coil unit 20D on the straight line X4. The order of exciting the excitation coils 21 may be other orders. The excitation coils 21 may be excited, for example, in the order of the coil unit 20A on the straight line X1, the coil unit 20C on the straight line X3, the coil unit 20B on the straight line X2, and the coil unit 20D on the straight line X4.

The plurality of coil units 20 disposed side by side on the same straight line among the straight lines X1 to X4 may be excited at the same time. Namely, for example, a plurality of the coil units 20A on the straight line X1 are initially excited at the same time. Subsequently, a plurality of the coil units 20B on the straight line X2 are excited at the same time. Subsequently, a plurality of the coil units 20C on the straight line X3 are excited at the same time. Subsequently, a plurality of the coil units 20D on the straight line X4 are excited at the same time. Hereinbelow, the same excitation may be repeatedly performed.

If a gap (gap between the straight lines T in the X direction) between the coil units 20 adjacent to each other on the same straight line among the lines X1 to X4 is a sufficient distance, even though the adjacent coil units 20 are excited at the same time, it is possible to prevent the coil units 20 from having adverse electromagnetic effects on detections thereof.

In the detection step, a change in the magnetic field in the surface layer portion 3$a$ is detected. In the detection step, a change in the magnetic field induced by the eddy current of the surface layer portion 3$a$ is detected. For example, if there is a flaw, a shape discontinuity, or the like in the surface layer portion 3$a$, the eddy current bypasses the flaw, the shape discontinuity, or the like and is changed, and the magnetic field is changed.

In the detection step, the calculation unit 17 calculates a difference between signals detected by the pair of detection coils 22. The calculation unit 17 generates image information indicating a detection result, based on a result of the calculation. The image information indicating the detection result is output to and on the display unit 19. The position, size, orientation, and the like of a flaw may be displayed in the image information indicating the detection result.

Subsequently, based on the detection result, it is determined whether or not there is a flaw (Step S6). Herein, based on the difference between the signals detected by the pair of detection coils 22, the calculation unit 17 may determine whether or not there is a flaw, or a user may determine whether or not there is a flaw by watching the image information displayed on the display unit 19.

If a flaw has not been detected, the process proceeds to Step S9, and if a flaw has been detected, the process proceeds to Step S7.

In Step S7, a repair step is performed. Herein, for example, the metallic powder is supplied once again, and a flawed portion is melted and cured. Thereafter, the flaw detection step is executed once again (Step S8). In the flaw detection step referred to herein, for example, similarly to Step S5, a flaw may be detected in the entire surface of the surface layer portion 3$a$, or a flaw may be detected only in a region corresponding to a repaired portion.

Subsequently, the process returns to Step S6 again, and it is determined whether or not there is a flaw. After it has been confirmed that there is no flaw, the process proceeds to Step S9. In Step S9, the production of the entire layers of the three-dimensional component 3 has ended, and it is determined whether or not the component has been completed. For example, it is determined whether or not the production of layers as designed has ended. If the production of the three-dimensional component has not ended, the process returns to Step S2. In Step S2, melting is performed by partially applying energy to the metallic powder (powder layer) of the second layer (n+1$^{th}$ layer) formed in Step S4 described above. The production of the three-dimensional component 3 is performed by repeating the same steps thereafter.

The probe 16 of the flaw detection device 15 includes the plurality of coil units 20 disposed side by side in the X direction intersecting the scanning direction. The flaw detection device 15 is capable of detecting flaws in a wide range in the X direction and reducing a flaw detection time by moving the probe 16 in the scanning direction. Since it is possible to detect a flaw in the surface layer portion 3$a$ of the three-dimensional component 3 during production, it is possible to produce the three-dimensional component 3 by further adding the metallic powder 2 after having confirmed that there is no flaw in the surface layer portion 3$a$. In the probe 16, the pair of detection coils 22 are disposed side by side in the scanning direction, and are disposed at positions overlapping each other in the Y direction. The flaw detection device 15 is capable of reducing effects of noise and accurately detecting a flaw by calculating the difference between the signals detected by the pair of detection coils 22. If a flaw has been detected in the surface layer portion 3$a$, it is possible to produce the three-dimensional component 3 by further adding the metallic powder 2 after repairing the flaw. Therefore, it is not necessary to perform flaw detection after the production of the three-dimensional component 3 has been completed, and to repair a flaw inside the three-dimensional component 3 based on a result thereof.

In the production apparatus 1, the bottom surface 16$a$ of the probe 16 is disposed higher than the lower end 6$a$ of the brush unit 6. Therefore, it is possible to detect a flaw in the surface layer portion 3$a$ of the three-dimensional component 3 in a state where the probe 16 is in no contact with the metallic powder 2. Since the probe 16 is in no contact with the metallic powder 2, it is possible to reduce the risk of occurrence of a flaw by preventing cracks of the added metallic powder 2. Since the probe 16 is in no contact with the three-dimensional component 3, it is possible to reduce the risk of damage of the three-dimensional component 3.

Since the probe 16 is disposed behind the brush unit 6 in the movement direction of the brush unit 6, the probe 16 passes by above the metallic powder 2 after the metallic powder 2 has been leveled by the brush unit 6. For this reason, it is possible to further reduce the risk of the probe 16 coming into contact with the metallic powder 2.

In the production apparatus 1, the probe 16 is attached to the brush unit 6, and thus the first moving mechanism 7 is capable of moving the probe 16 along with the brush unit 6. Therefore, it is not necessary to separately perform movement of the brush unit 6 and movement of the probe 16, and to shorten a production time of the entire process containing the inspection step.

In the related art, there is a concern that due to reaction with metal in eddy current testing (ECT), the sensitivity of the probe is lowered by the metallic powder. However, the inventors have found that there is almost no electrical connection between particles of the metallic powder and detection of a flaw in a surface layer portion of a three-dimensional component is not affected by the metallic powder accumulated thereon.

In the probe 16, another coil unit 20 is not disposed behind one coil unit 20 on each of the straight lines Y1 to Y4 extending in the scanning direction. Therefore, the excitation coil 21 and the detection coil 22 positioned behind in the scanning direction have reduced effects on excitation and detection, respectively. In the probe 16, the coil units 20 are prevented from having adverse electromagnetic effects on each other. For this reason, in the probe 16, a large number of the coil units 20 are disposed, and thus it is possible to detect flaws in a wide range in the X direction.

In the excitation step, the order of excitation of the excitation coils 21 is changed depending on the positions of the coil units 20A to 20D in the scanning direction. Therefore, it is possible to prevent interference between the coil units 20 close to each other in the scanning direction. For example, excitation and detection performed by the coil unit 20B are not easily affected by excitation and detection performed by the coil unit 20A close thereto. The coil units 20 are prevented from having adverse electromagnetic effects on each other by elaborating the order of excitation in the excitation step. For this reason, a large number of the coil units 20 are disposed in the probe 16, and thus it is possible to detect flaws in a wide range in the X direction.

In the above-mentioned first embodiment, the brush unit 6 and the probe 16 are moved with respect to the powder bed 25; however, the brush unit 6 and the probe 16 may be stopped and the powder bed 25 may be moved. For example, the work table 4 holding the powder bed 25 and the three-dimensional component 3, and the guide portion 9 may be moved in the X direction and the Y direction.

"Relatively moving the brush unit 6 with respect to the powder bed 25" contains "a case where the brush unit 6 is moved in a state where the work table 4 is stopped" and "a case where the work table 4 is moved in a state where the brush unit 6 is stopped". "Relatively moving the probe 16 with respect to the surface layer portion 3a of the three-dimensional component 3" contains "a case where the probe 16 is moved in a state where the work table 4 is stopped" and "a case where the work table 4 is moved in a state where the probe 16 is stopped".

Figure 8:
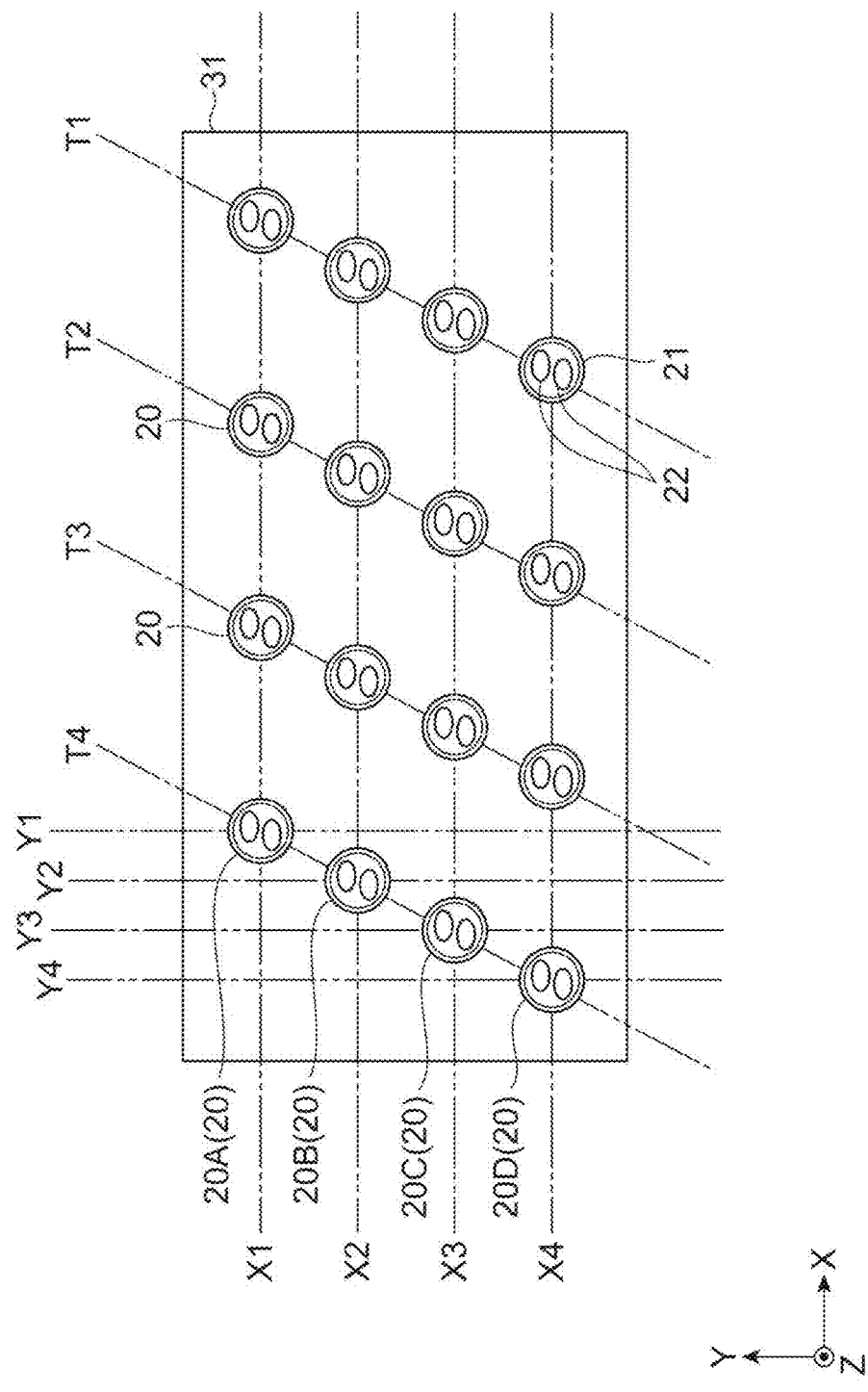
FIG. 8 is a view illustrating the disposition of a plurality of coil units in a probe of a second embodiment of the present disclosure as seen from above.

Subsequently, a probe 31 according to a second embodiment will be described with reference to FIG. 8. The probe 31 differs from the probe 16 in that the length in the X direction and the number of the coil units 20 differ therebetween. The probe 31 is short in the X direction compared to the probe 16. In the probe 31, for example, four coil units 20 are disposed in the X direction. In FIG. 8, virtual straight lines T1 to T4 obliquely extending with respect to the X direction and the Y direction are illustrated. Four coil units 20A to 20D are disposed on each of the straight lines T1 to T4.

A flaw detection device including the probe 31 may include a probe moving mechanism moving the probe 31 in the X direction and the Y direction. The probe moving mechanism contains a first guide rail extending in the Y direction and a second guide rail extending in the X direction. The probe moving mechanism moves the second guide rail along the first guide rail, and moves the probe 31 along the second guide rail. The probe moving mechanism may be configured to include, for example, a rack and pinion type driving mechanism. The probe moving mechanism may include other driving mechanisms, for example, a cylinder, a ball screw, or the like.

Figure 9:
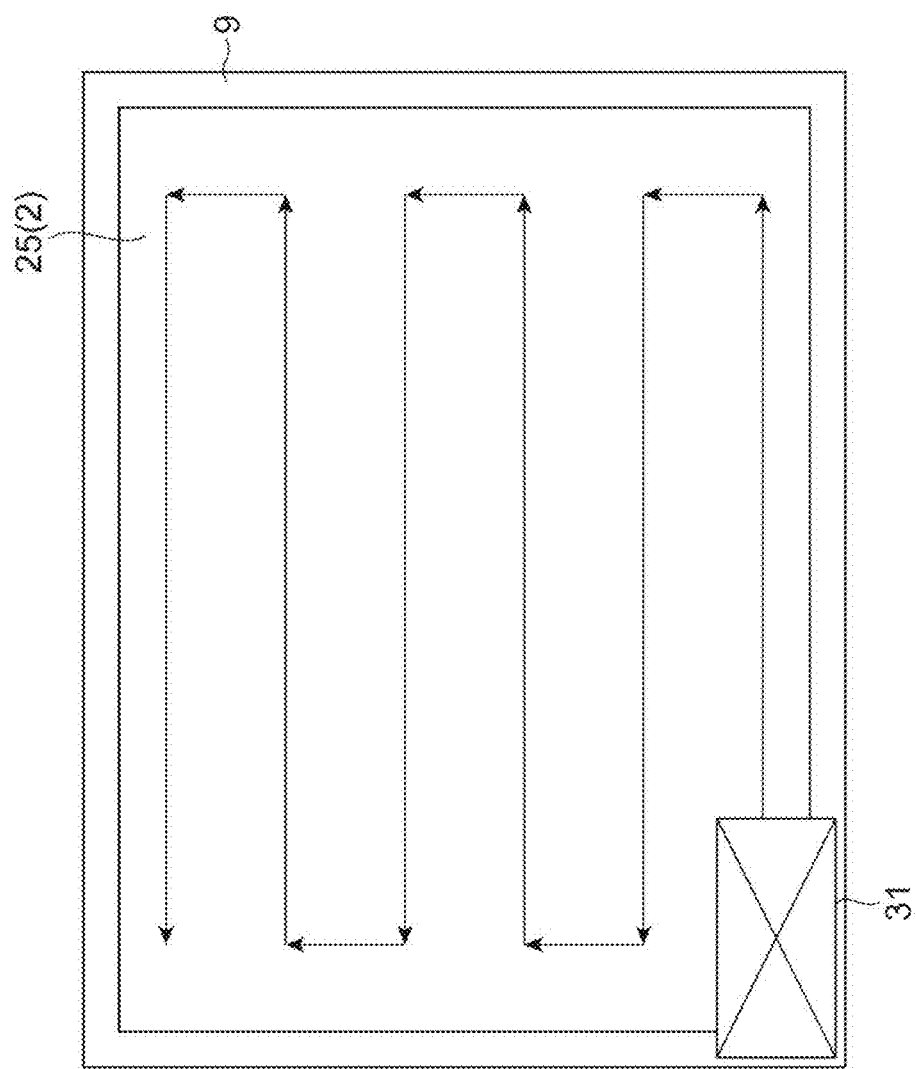
FIG. 9 is a plan view illustrating a movement path of the probe of the second embodiment.

FIG. 9 is a plan view illustrating a movement path of the probe 31. The powder bed 25 follows the shape of the guide portion 9 and forms, for example, a rectangular shape in a plan view. The three-dimensional component 3 is present in the powder bed 25. The length of the probe 31 in the X direction is shorter than the length of the powder bed 25 in the X direction. The length of the probe 31 in the Y direction is shorter than the length of the powder bed 25 in the Y direction. In FIG. 9, the movement path of the probe 31 is illustrated by arrows.

Before the start of the flaw detection step, the probe 31 is disposed at a position corresponding to one corner portion of the powder bed 25. In the flaw detection step, the excitation step and the detection step are executed by moving the probe 31 in the X direction. The probe 31 is moved by the length of the powder bed 25 in the X direction. Subsequently, the probe 31 is moved in the Y direction. The probe 31 is moved, for example, corresponding to the length of the probe 31 in the Y direction. Subsequently, the probe 31 is moved in a direction opposite to the previous movement direction in the X direction. The excitation step and the detection step are executed during this movement. The probe 31 is moved in the Y direction again. As described above, the excitation step and the detection step are executed while moving the probe 31. Herein, the excitation step and the detection step are executed for, for example, the entire area of the powder bed 25. The movement path of the probe is not limited to being aligned along a straight line, and may be curved along an arc. In the flaw detection step, the powder bed 25 is stopped, and the probe 31 is moved. Therefore, the probe 31 is relatively moved with respect to the powder bed 25.

In the excitation step, for example, if the probe 31 is moved in the X direction (toward the right), it is possible to perform excitation of the excitation coils 21 in the order of the coil units 20 on the straight line T1, the coil units 20 on the straight line T2, the coil units 20 on the straight line T3, and the coil units 20 on the straight line T4 illustrated in FIG. 8. Similarly, in the excitation step, if the probe 31 is moved oppositely (toward the left) in the X direction, it is possible to perform excitation of the excitation coils 21 in the order of the coil units 20 on the straight line T4, the coil units 20 on the straight line T3, the coil units 20 on the straight line T2, and the coil units 20 on the straight line T1. In the excitation step, excitation may be performed in other orders.

The movement path of the probe 31 is not limited to the movement path illustrated in FIG. 9. For example, a movement path in the following modification example may be employed. Before the start of the flaw detection step, the probe 31 is disposed at a position corresponding to one corner portion of the powder bed 25. In the flaw detection step, the excitation step and the detection step are executed by moving the probe 31 in the Y direction. The probe 31 is moved by the length of the powder bed 25 in the Y direction. Subsequently, the probe 31 is moved in the X direction. The probe 31 is moved, for example, corresponding to the length of the probe 31 in the X direction. Subsequently, the probe 31 is moved in a direction opposite to the previous movement direction in the Y direction. The excitation step and the detection step are executed during this movement. The probe 31 is moved in the X direction again. As described above, the excitation step and the detection step are executed while moving the probe 31. In this case, the order of excitation of the coil units 20 may be the same order as that in the first embodiment.

Figure 10:
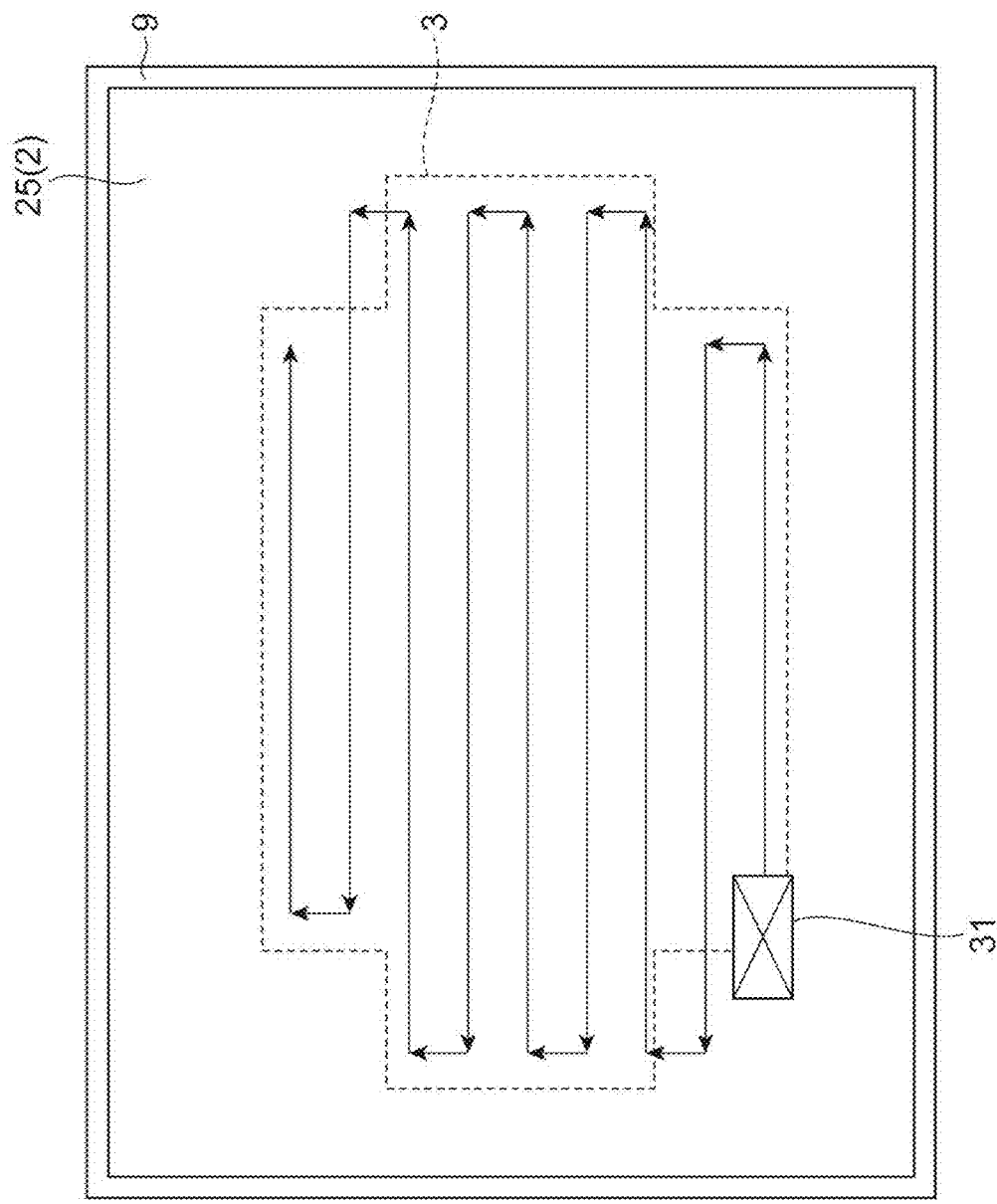
FIG. 10 is a plan view illustrating another movement path of the probe.

FIG. 10 is a plan view illustrating another movement path of the probe 31. In FIG. 10, the movement path of the probe 31 is illustrated by arrows. The three-dimensional component 3 is disposed in the powder bed 25. The length of the three-dimensional component 3 in the X direction is not constant, but is changed depending on positions in the Y direction. The length of the three-dimensional component 3 in the Y direction is not constant, but is changed depending on positions in the X direction.

In the flaw detection step, the probe 31 may be moved according to the shape of the three-dimensional component 3. In the flaw detection step, for example, the probe 31 may not be moved over the entirety of the powder bed 25. In the flaw detection step, the probe 31 may be moved corresponding to only a portion where the three-dimensional component 3 is present. As a modification example of the probe 31 illustrated in FIG. 8, the probe 31 may have a configuration where a plurality of the coil units 20 are not disposed along the straight lines X1 to X4. For example, the probe may include a plurality of the coil units 20 disposed side by side along a plurality of straight lines inclined with respect to the X direction.

Figure 11:
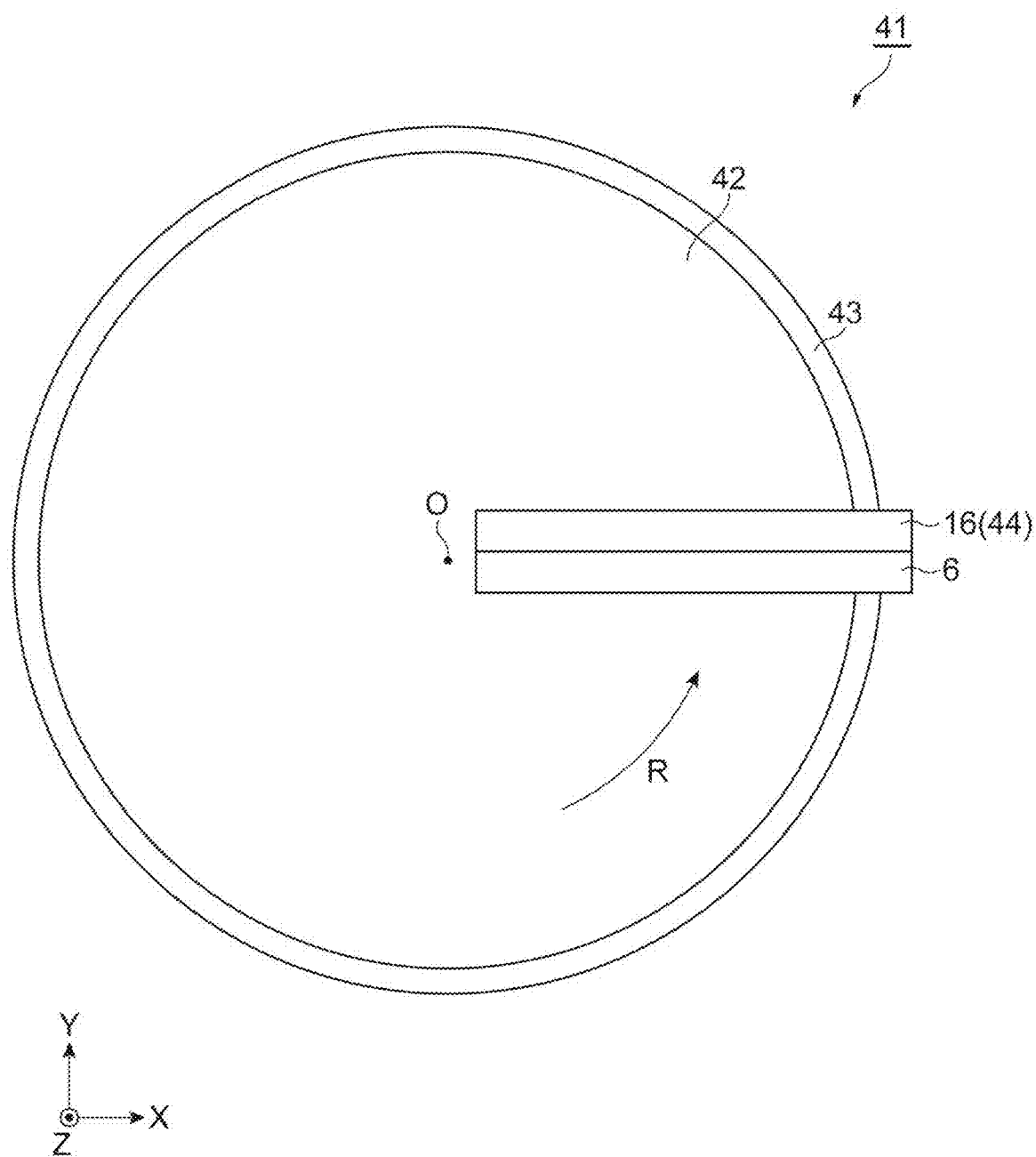
FIG. 11 is a plan view illustrating an apparatus for producing a three-dimensional multilayer object of a third embodiment.

Subsequently, a production apparatus 41 according to a third embodiment will be described with reference to FIG. 11. The production apparatus 41 differs from the production apparatus 1 of the first embodiment in that a powder bed 42 having a circular shape is held, and in that a work table holding the powder bed 42 rotates. In the description of the production apparatus 41, the same descriptions as those in the above-mentioned embodiment will be omitted.

The production apparatus 41 includes the work table holding the powder bed 42 having a circular shape, and a guide portion 43. The guide portion 43 forms a cylindrical shape. The work table is disposed inside the guide portion 43, and can be ascended and descended. A three-dimensional component and the powder bed 42 are present on the work table. The production apparatus 41 contains a work table rotating mechanism rotating the work table around a center O. The work table rotating mechanism, for example, is capable of including an electric motor, a rotary shaft, a gear, a power transmission belt, and the like.

The production apparatus 41 contains a powder supply unit (application mechanism) supplying (forming powder layers) the metallic powder 2 to a supply region on the work table (powder bed 42). The powder supply unit contains the brush unit 6. The brush unit 6 extends from the center O in a radial direction of the work table. In the production apparatus 41, if the work table rotates, the powder bed 42 and the three-dimensional component move. The guide portion 43 rotates, for example, along with the work table. In FIG. 11, a rotation direction R of the work table is illustrated by an arrow. The work table may rotate opposite to the rotation direction R. The length of the brush unit 6 corresponds to, for example, the radius length of the work table or the guide portion 43. The brush unit may be longer than, for example, the diameter of the work table or the guide portion 43.

The production apparatus 41 contains an energy application unit. Similarly to the energy application unit in the first embodiment, the energy application unit may be, for example, a radiation gun (electron gun) radiating electron beams as energy beams, or a laser irradiation unit radiating laser beams as energy beams. The energy application unit irradiates an irradiation region on the work table (powder bed 42) with energy beams. The irradiation region is set downstream of the powder supply unit in the rotation direction R.

The production apparatus 41 contains a flaw detection device 44 including the probe 16. A longitudinal direction of the probe 16 is disposed along the radial direction of the work table. The probe 16 is disposed behind the brush unit 6 in the rotation direction R of the work table. The length of the probe 16 in the X direction corresponds to, for example, the radius length of the work table or the guide portion 43. The probe 16 may be longer than, for example, the diameter of the work table or the guide portion 43. The length of the probe 16 may be, for example, the same as the length of the brush unit 6, or may be shorter than the length of the brush unit 6. The probe 16 may be attached to the brush unit 6, or may be disposed at a position apart from the brush unit 6. The probe 16 may serve as a regulation unit.

The production apparatus 41 is capable of repeatedly performing an energy application step, a powder supply step (step of leveling an upper surface of a conductive powder), and a flaw detection step in the order mentioned. In the energy application step, the metallic powder 2 is melted or sintered by applying energy to the metallic powder 2 while rotating the work table. In the powder supply step, the metallic powder 2 is supplied to the supply region on the work table. In the flaw detection step, a flaw may be detected in a surface layer portion of the three-dimensional component on the work table.

In the production apparatus 41, the work table rotates, and thus it is possible to relatively move the brush unit 6 with respect to the powder bed 42 on the work table. Therefore, it is possible to level a surface of the powder bed 42. Similarly, it is possible to relatively move the flaw detection device 44 with respect to the three-dimensional component on the work table. Therefore, it is possible to detect a flaw in the three-dimensional component using the probe 16. In this case, a direction opposite to the rotation direction R of the work table is a scanning direction. The scanning direction is a direction not aligned along a straight line but along a curved line curved along an arc. The probe 16 may be configured to serve as the brush unit 6. The production apparatus 41 relatively moves the brush unit 6 and the probe 16 with respect to the powder bed 42 by rotating the work table, but may stop the work table and move the brush unit 6 and the probe 16 with respect to the powder bed 42.

Figure 12:
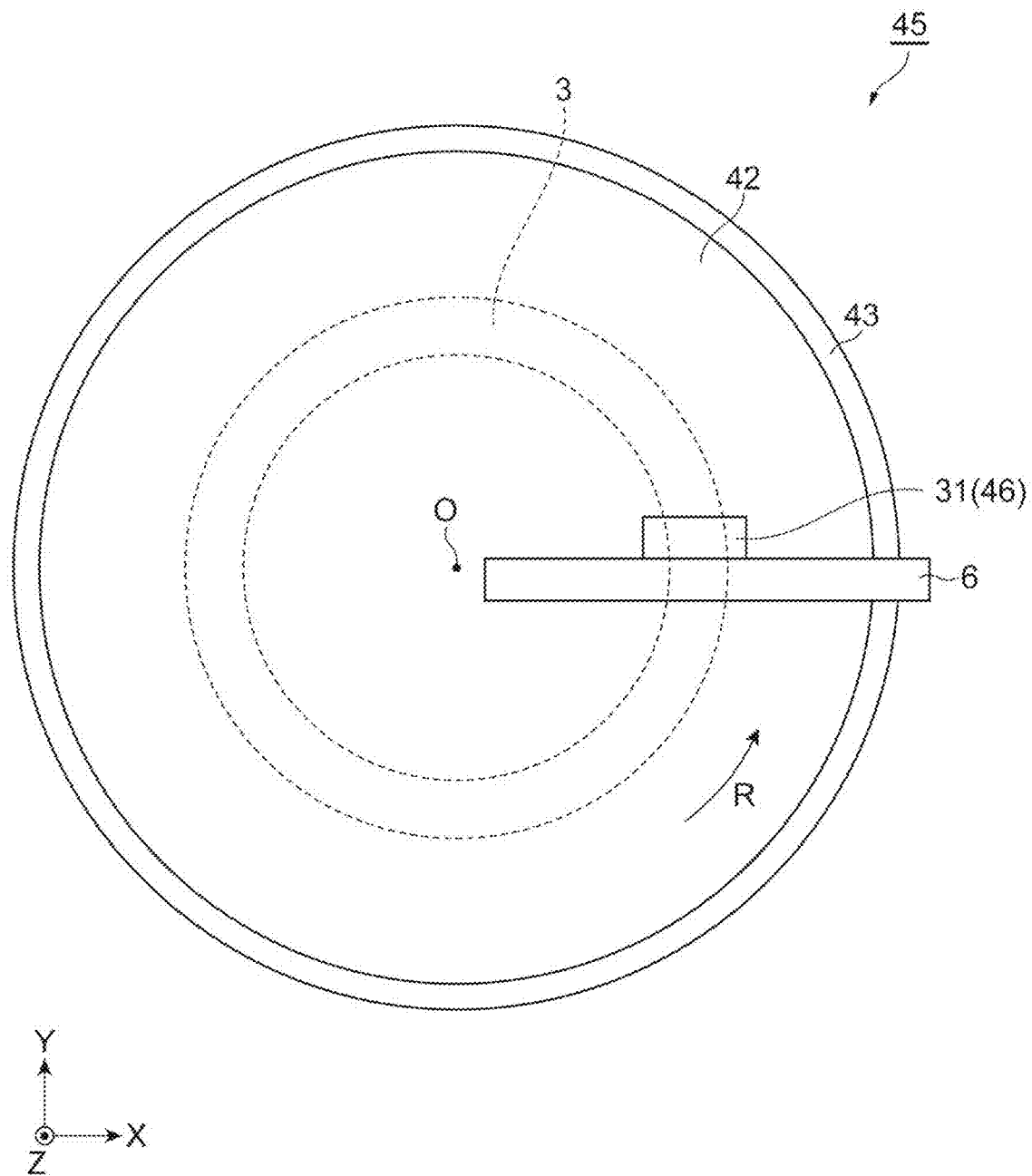
FIG. 12 is a plan view illustrating an apparatus for producing a three-dimensional multilayer object of a fourth embodiment.

FIG. 12 is a plan view of a production apparatus 45 according to a fourth embodiment. The production apparatus 45 differs from the production apparatus 41 of the third embodiment in that the production apparatus 45 includes the probe 31 instead of the probe 16. The production apparatus 45 contains a flaw detection device 46 including the probe 31. The probe 31 is the probe described in the above-mentioned second embodiment. The probe 31 is shorter than the brush unit 6 in a longitudinal direction (X direction illustrated). The probe 31 is movable with respect to the brush unit 6 in the longitudinal direction. The production apparatus 45 may contain a probe moving mechanism moving the probe 31 in the radial direction of the work table. The probe moving mechanism may include, for example, an electric motor, a hydraulic cylinder, a rack and pinion, a guide rail, a ball screw, and the like.

For example, the three-dimensional component 3 forming a cylindrical shape is disposed on the work table. The probe moving mechanism is capable of moving the probe 31 above the three-dimensional component 3. In the flaw detection step, it is possible to detect a flaw in the three-dimensional component 3 by rotating the work table and thereby relatively moving the probe 31 with respect to the three-dimensional component 3. The flaw detection device 46 may detect a flaw in the three-dimensional component 3 by relatively moving the probe 31 in a circumferential direction of the three-dimensional component 3.

Figure 13:
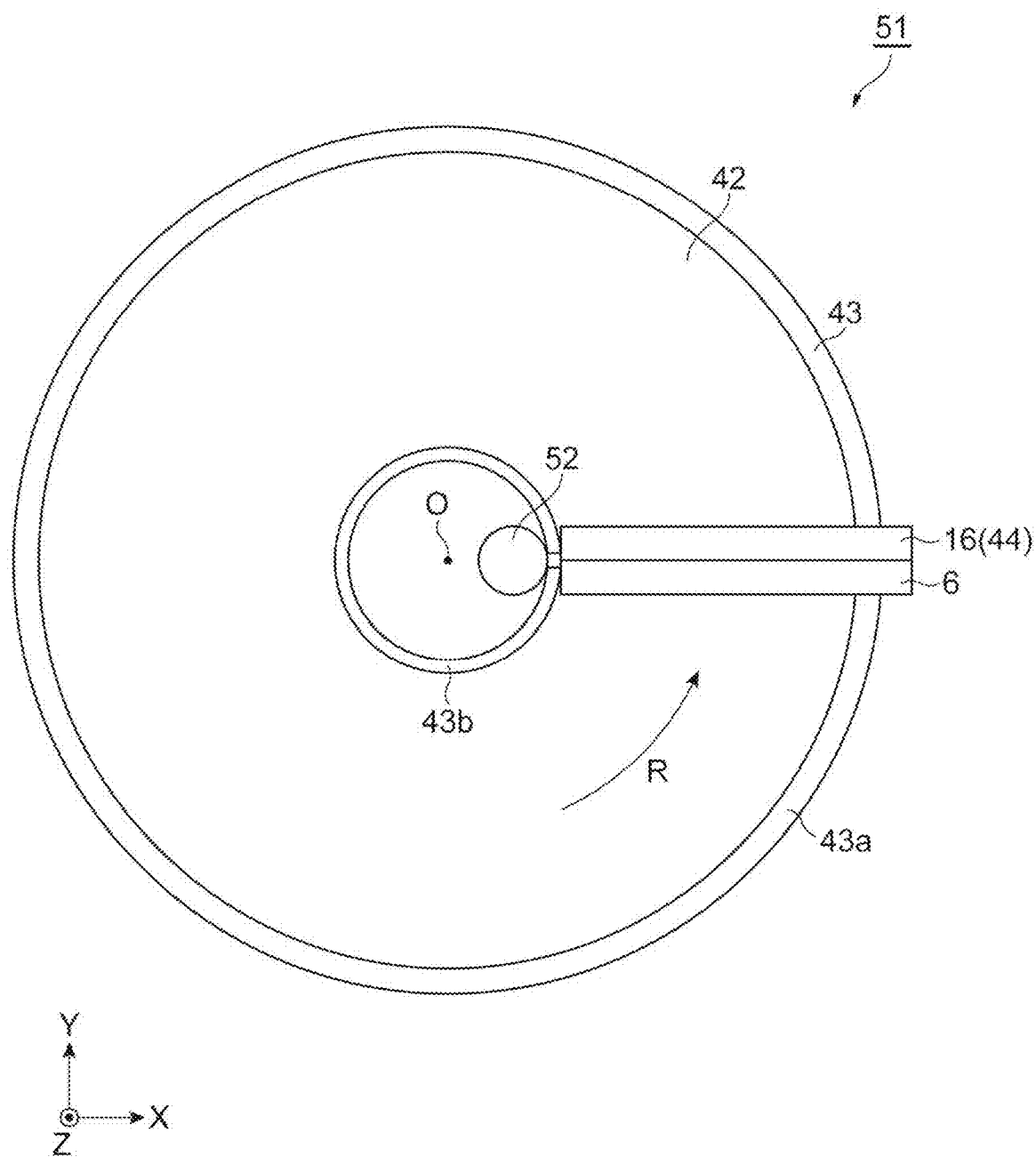
FIG. 13 is a plan view illustrating an apparatus for producing a three-dimensional multilayer object of a fifth embodiment.
Figure 14:
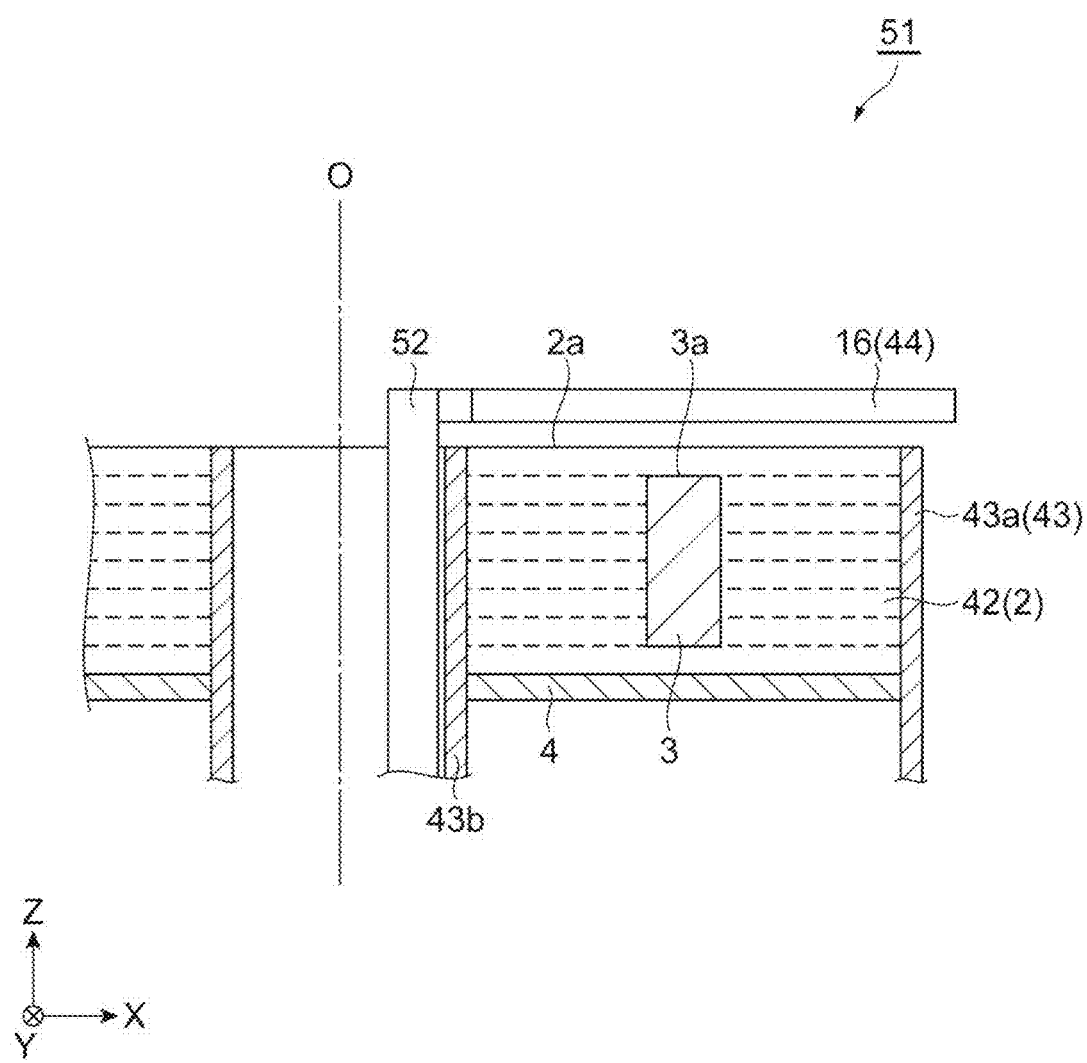
FIG. 14 is a cross-sectional view of the apparatus for producing a three-dimensional multilayer object illustrated in FIG. 13.

FIGS. 13 and 14 are views illustrating a production apparatus 51 according to a fifth embodiment. The production apparatus 51 differs from the production apparatus 41 of the third embodiment illustrated in FIG. 11 in that the powder bed 42 in which an opening portion is formed at a center is held. The opening portion formed at the center of the powder bed 42 passes therethrough in the Z direction. The work table 4 forms an annular shape in a plan view. The guide portion 43 includes an outer wall 43a and an inner wall 43b which form a cylindrical shape. The powder bed 42 and the three-dimensional component 3 are disposed in a region between the outer wall 43a and the inner wall 43b.

The production apparatus 51 includes a support portion 52 supporting the brush unit 6 and the probe 16. The support portion 52 forms, for example, a bar shape and extends in the Z direction. The support portion 52 is disposed so as to pass through the opening portion at the center of the powder bed 42. For example, an end portion of the probe 16 adjacent to a central portion side is connected to the support portion 52. The support portion 52 is disposed, for example, so as to be in contact with the inner wall 43b in a plan view. For example, the support portion 52 may be disposed at the center O of the work table 4, or may be disposed outside the outer wall 43a.

The production apparatus 51 is capable of rotationally moving the work table 4 and the guide portion 43. The flaw detection device 44 is capable of detecting a flaw in the powder bed 42 using the probe 16. The probe 16 may be configured to serve as the brush unit. The production apparatus 51 may be configured to include the probe 31 instead of the probe 16. The probe 31 is movable, for example, along the brush unit 6 in a radial direction of the powder bed 42.

The present disclosure is not limited to the embodiments described above, and the following various modifications can be made without departing from the concept of the present disclosure.

In the above-mentioned embodiments, the configuration where the probe is attached to the regulation unit has been described; however, a configuration where the probe is not attached to the regulation unit may be employed. The probe may be supported by other members, and may be movable by the probe moving mechanism moving the probe in the scanning direction. The scanning direction of the probe may be the same as the movement direction of the regulation unit, or may be a direction intersecting the movement direction of the regulation unit. The scanning direction is not limited to one direction, and may be a plurality of directions. For example, a configuration where a plurality of the probes having different scanning directions are included may be employed.

A configuration where the probes are disposed on both sides in the movement direction of the regulation unit may be employed. For example, in FIG. 2, if the brush unit 6 moves to the right, it is possible to perform flaw detection with the probe 16 provided on the left side of the brush unit 6. If the brush unit 6 moves to the left, it is possible to perform flaw detection with the probe 16 provided on the right side of the brush unit 6.

In the above-mentioned embodiments, the probe is attached to the regulation unit; however, the probe may be attached ahead of the regulation unit, or may be built into the regulation unit. The probe itself may function as the regulation unit leveling the conductive powder. The probe may be disposed spaced apart from the three-dimensional multilayer object and may be in no contact therewith.

In the above-mentioned embodiments, the work table 4 has a rectangular shape; however, the work table 4 is not limited to having a rectangular shape. The production apparatus 1 may include, for example, a work table having a circular shape and a guide portion having a circular shape, and may contain an accommodation portion having a circular shape formed by the work table and the guide portion.

A mechanism forming powder layers in Steps S1 and S4 is not limited to the mechanisms in the above-mentioned embodiments. The regulation unit may regulate the amount of the conductive powder to be supplied at a constant value, and be able to level a surface of a laminate. For example, the production apparatus 1 may have a configuration where a supply unit supplying a constant amount of the conductive powder while moving in one direction is included and the probe is attached to the supply unit. For example, a configuration where powder layers are formed and in parallel, flaw detection is performed by the flaw detector by supplying the powder while moving the supply unit above the work table 4 in the first direction may be employed.

The probe is not limited to being attached to the regulation unit. The probe may perform flaw detection while moving following the movement of the regulation unit. The probe may move regardless of the movement of the regulation unit. The production apparatus may not include the regulation unit.

The production apparatus and the production method of the present disclosure are not limited to being applied to a powder bed method. The production apparatus and the production method may be applied to a powder deposition method. In this case, it is possible to provide the probe in a material ejection unit (nozzle) ejecting the conductive powder (material). It is possible to move the probe along with the material ejection unit. Therefore, after the conductive powder has been ejected from the material ejection unit and melted or sintered, it is possible to perform flaw detection with the probe.

In the powder deposition method, the probe is not limited to being attached to the material ejection unit. For example, a configuration where the probe moving mechanism moving the probe and a material ejection unit moving mechanism moving the material ejection unit are separately included may be employed. For example, a configuration where the probe is disposed at a position apart from the material ejection unit may be employed. Therefore, even though the temperature of the material ejection unit rises when beams are radiated, it is possible to prevent the transmission of heat from the material ejection unit to the probe. As a result, the temperature rise of the probe is prevented. The probe may perform flaw detection while moving following the movement of the material ejection unit. The probe may move, for example, regardless of the movement of the material ejection unit.

In the above-mentioned embodiments, the probe 16 (flaw detector) including the pair of detection coils 22 disposed inside the excitation coil 21 at positions overlapping each other in the scanning direction has been described; however, the pair of detection coils 22 may not be disposed at positions overlapping each other in the scanning direction. The pair of detection coils 22 may be disposed at positions overlapping each other in a direction intersecting the scanning direction. The fact that positions overlap each other in the scanning direction contains a case where the pair of detection coils 22 are disposed such that portions thereof overlap each other in the scanning direction. For example, the central positions of the pair of detection coils 22 may not be disposed at the same positions in the direction intersecting the scanning direction. The flaw detector may have a configuration where three or more detection coils 22 are disposed inside the excitation coil 21.

In the above-mentioned embodiments, the production apparatuses 1, 41, 45, and 51 and the method for producing a three-dimensional multilayer object using the probes 16 and 31, in each of which the pair of detection coils 22 are disposed inside the excitation coil 21, have been described. However, in the production apparatuses 1, 41, 45, and 51 and the method for producing a three-dimensional multilayer object, it is possible to perform flaw detection using other probes. For example, flaw detection may be performed using a probe including one detection coil disposed inside the excitation coil, or flaw detection may be performed using a probe including the detection coil disposed outside the excitation coil.

INDUSTRIAL APPLICABILITY

According to some aspects of the present disclosure, it is possible to provide the apparatus for producing a three-dimensional multilayer object, the method for producing a three-dimensional multilayer object, and the flaw detector capable of detecting a flaw in a three-dimensional multilayer object during the production of the three-dimensional multilayer object.

REFERENCE SIGNS LIST 1, 41, 45, 51: production apparatus (apparatus for producing a three-dimensional multilayer object), 2: metallic powder (conductive powder), 3: three-dimensional component (three-dimensional multilayer object), 3*a*: surface layer portion, 4: work table (holding unit), 5: vertical position adjusting mechanism, 6: brush unit (regulation unit), 7: first moving mechanism (regulation unit moving mechanism and probe moving mechanism), 8: radiation gun (energy application unit), 15: flaw detection device, 16, 31: probe (flaw detector), 16*a*: bottom surface of probe, 20: coil unit, 21: excitation coil, 22: detection coil, 23: ferrite core (iron core), 25, 42: powder bed (laminate of metallic powder), X: X direction (second direction), Y: Y direction (first direction), Z: Z direction (vertical direction).

The invention claimed is:

1. A method for producing a three-dimensional multilayer object in which a three-dimensional multilayer object is produced by partially applying energy to a conductive powder and thereby melting or sintering and curing the conductive powder, the method comprising:

an energy application step of applying energy to the conductive powder to melt or sinter the conductive powder; and a flaw detection step of detecting a flaw in a surface layer portion of the cured three-dimensional multilayer object by relatively moving a probe, which is disposed spaced apart from the surface layer portion, with respect to the surface layer portion, and the probe includes an excitation coil and a pair of detection coils, wherein the flaw detection step contains an excitation step of generating an eddy current in the surface layer portion by the excitation coil, and a detection step of detecting a change in a magnetic field of the surface layer portion by the pair of detection coils, and wherein the pair of detection coils are offset from each other along a direction orthogonal to a movement direction of the probe.

2. The method for producing a three-dimensional multilayer object according to claim 1, further comprising:

a step of leveling an upper surface of the conductive powder held by a holding unit by relatively moving a regulation unit with respect to the conductive powder.

3. The method for producing a three-dimensional multilayer object according to claim 2, wherein the flaw detection step is executed when the step of leveling is executed.

4. The method for producing a three-dimensional multilayer object according to claim 3, wherein in the flaw detection step, a flaw is detected in the surface layer portion by disposing a bottom surface of the probe higher than a lower end of the regulation unit and relatively moving the probe along with the regulation unit with respect to the surface layer portion.

5. The method for producing a three-dimensional multilayer object according to claim 4, wherein in the flaw detection step, a flaw is detected in the surface layer portion by disposing the probe behind the regulation unit in a relative movement direction of the regulation unit.

* * * * *